US009493165B2

(12) United States Patent
Yoshino et al.

(10) Patent No.: US 9,493,165 B2
(45) Date of Patent: Nov. 15, 2016

(54) DRIVE FORCE CONTROL DEVICE AND DRIVE FORCE CONTROL METHOD FOR VEHICLE

(71) Applicant: Nissan Motor Co., Ltd., Kanagawa (JP)

(72) Inventors: Takahiro Yoshino, Kanagawa (JP); Masahiro Iriyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/650,076

(22) PCT Filed: Nov. 19, 2013

(86) PCT No.: PCT/JP2013/081178
§ 371 (c)(1),
(2) Date: Jun. 5, 2015

(87) PCT Pub. No.: WO2014/091889
PCT Pub. Date: Jun. 19, 2014

(65) Prior Publication Data
US 2015/0353089 A1 Dec. 10, 2015

(30) Foreign Application Priority Data
Dec. 10, 2012 (JP) ................................ 2012-269504

(51) Int. Cl.
*B60W 30/188* (2012.01)
*B60W 10/04* (2006.01)
(Continued)

(52) U.S. Cl.
CPC ............ *B60W 30/188* (2013.01); *B60W 10/04* (2013.01); *B60W 10/06* (2013.01); *B60W 10/101* (2013.01); *B60W 10/107* (2013.01); *B60W 30/18* (2013.01); *B60W 2510/0604* (2013.01); *B60W 2520/105* (2013.01); *B60W 2540/10* (2013.01);
(Continued)

(58) Field of Classification Search
None
See application file for complete search history.

(56) References Cited

U.S. PATENT DOCUMENTS

| 5,722,500 | A | 3/1998 | Toukura et al. |
| 5,730,680 | A | 3/1998 | Toukura |
| 7,955,216 | B2 * | 6/2011 | Makiyama .......... F16H 61/0213 477/119 |

FOREIGN PATENT DOCUMENTS

| JP | 9-100886 A | 4/1997 |
| JP | 9-112680 A | 5/1997 |

(Continued)

OTHER PUBLICATIONS

International Preliminary Report on Patentability issued in corresponding Application No. PCT/JP2013/081178, mailed on Jun. 11, 2015 (10 pages).

*Primary Examiner* — Erin D Bishop
(74) *Attorney, Agent, or Firm* — Osha Liang LLP

(57) ABSTRACT

A drive force control method for a vehicle, the vehicle having an accelerator pedal, a motive force source that outputs a driving force in the form of a rotation according to an accelerator opening of the accelerator pedal, a drive wheel, and a transmission that transmits the rotation output from the motive force source to the drive wheel after changing a rotation speed thereof, the method including detecting the accelerator opening, detecting a vehicle running condition, calculating a target vehicle drive force based on the accelerator opening, calculating a target input rotation speed of the transmission based on the target vehicle drive force, calculating a target input torque of the transmission based on the target vehicle drive force, and calculating a target vehicle drive force in a vehicle deceleration state that is a variable value depending on the vehicle running condition.

4 Claims, 26 Drawing Sheets

(51) Int. Cl.
  *B60W 10/101* (2012.01)
  *B60W 10/06* (2006.01)
  *B60W 10/107* (2012.01)
  *B60W 30/18* (2012.01)

(52) U.S. Cl.
  CPC .. *B60W2550/141* (2013.01); *B60W 2710/105* (2013.01); *B60W 2710/1011* (2013.01); *B60W 2710/1022* (2013.01)

(56) References Cited

FOREIGN PATENT DOCUMENTS

| JP | 11-78621 A | 3/1999 |
| JP | 11-280880 A | 10/1999 |
| JP | 2001-328462 A | 11/2001 |
| JP | 3541661 B2 | 4/2004 |

\* cited by examiner

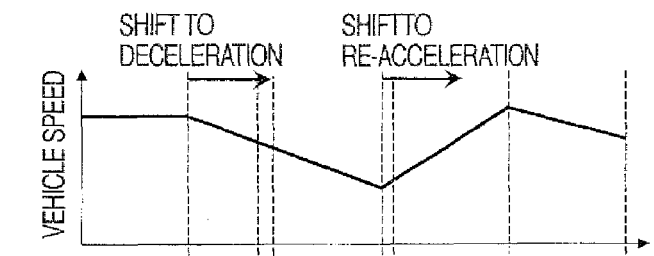
FIG. 25A
FIG. 25B
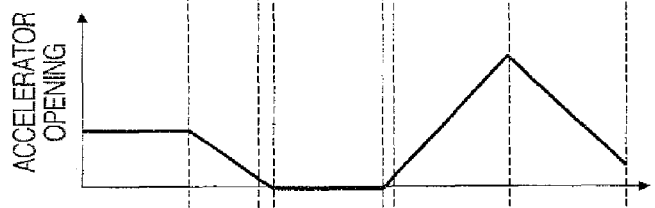
FIG. 25C
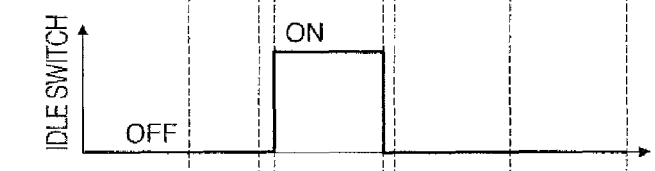
FIG. 25D
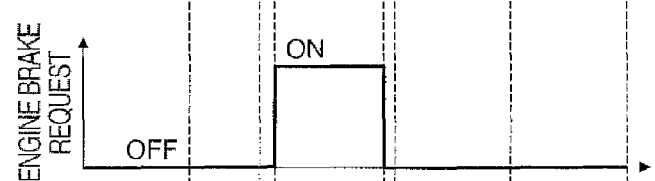
FIG. 25E
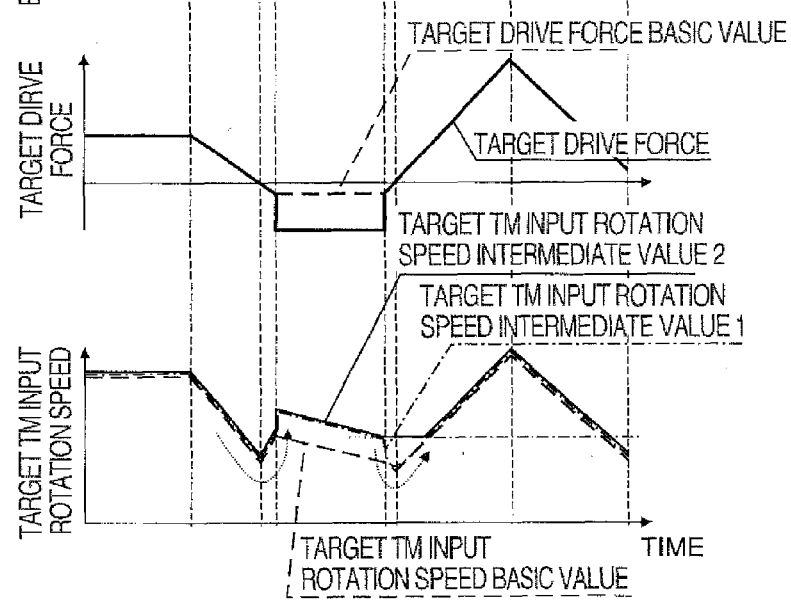
FIG. 25F

DRIVE FORCE CONTROL DEVICE AND DRIVE FORCE CONTROL METHOD FOR VEHICLE

CROSS-REFERENCE TO RELATED APPLICATIONS

The present application is a national stage application of PCT Application No. PCT/JP2013/081178, filed Mar. 14, 2015, and claims priority from Japanese Patent Tokugan JP2012-269504, filed Dec. 10, 2012, in Japan, the contents of which are hereby incorporated by reference in their entirety.

BACKGROUND

1. Technical Field

This invention relates to power-train torque demand control for controlling a gear ratio of an automatic transmission and an operation of an internal combustion engine on the basis of a target vehicle drive force.

2. Related Art

A method of controlling an output of an internal combustion engine on the basis of a depression amount of an accelerator pedal and controlling a gear ratio of an automatic transmission on the basis of the depression amount of the accelerator pedal and a vehicle speed is widely employed as a conventional method of controlling a drive force of a vehicle. In this method, the engine and the transmission are controlled independently in accordance with respective individual target values.

Meanwhile, JP2001-328462A, published by the Japan Patent Office in 2001, proposes power-train torque demand (PTD) control in which a target vehicle drive force is set on the basis of an accelerator pedal depression amount and a vehicle speed, whereupon a gear ratio of an automatic transmission and a torque of an internal combustion engine are controlled in an integrated fashion so that the target vehicle drive force is obtained.

SUMMARY OF INVENTION

When a conventional controller is applied to a vehicle installed with a continuously variable transmission, the target drive force of the vehicle is set on the basis of an operating condition, whereupon a target rotation speed and a target torque of the internal combustion engine are determined on the basis of the target drive force. When a running load of the vehicle is large, the target rotation speed of the internal combustion engine is corrected to a higher value.

However, this prior art does not describe control of the engine rotation speed during a transition process from deceleration to acceleration.

One or more embodiments of the present invention controls a motive force source of a vehicle to which torque demand control is applied appropriately when the vehicle accelerates after decelerating.

A drive force control device according to one or more embodiments of the present invention may be for a vehicle comprising an accelerator pedal, a motive force source that outputs a drive force in the form of a rotation according to an accelerator opening of the accelerator pedal, a drive wheel, and a transmission that transmits the rotation output from the motive force source to the drive wheel after changing a rotation speed thereof.

The drive force control device comprises an accelerator pedal opening sensor that detects the accelerator opening, a vehicle running condition sensor that detects a vehicle running condition, and a programmable controller. The controller is programmed to calculate a target vehicle drive force on the basis of the accelerator opening, calculate a target input rotation speed of the transmission on the basis of the target vehicle drive force, calculate a target input torque of the transmission on the basis of the target vehicle drive force, calculate a target vehicle drive force in a vehicle deceleration state that is a variable value depending on the vehicle running condition, calculate a target input rotation speed of the transmission in the vehicle deceleration state on the basis of the target vehicle drive force in the vehicle deceleration state, and correct the target input rotation speed of the transmission in a vehicle non-deceleration state on the basis of the target input rotation speed of the transmission in the vehicle deceleration state.

The details as well as other features and advantages of one or more embodiments of the present invention are set forth in the remainder of the specification and are shown in the accompanying drawings.

BRIEF DESCRIPTION OF DRAWINGS

FIGS. 25A-25F are timing charts illustrating functions of the second target TM input rotation speed intermediate value computation part.

DETAILED DESCRIPTION

Figure 1:
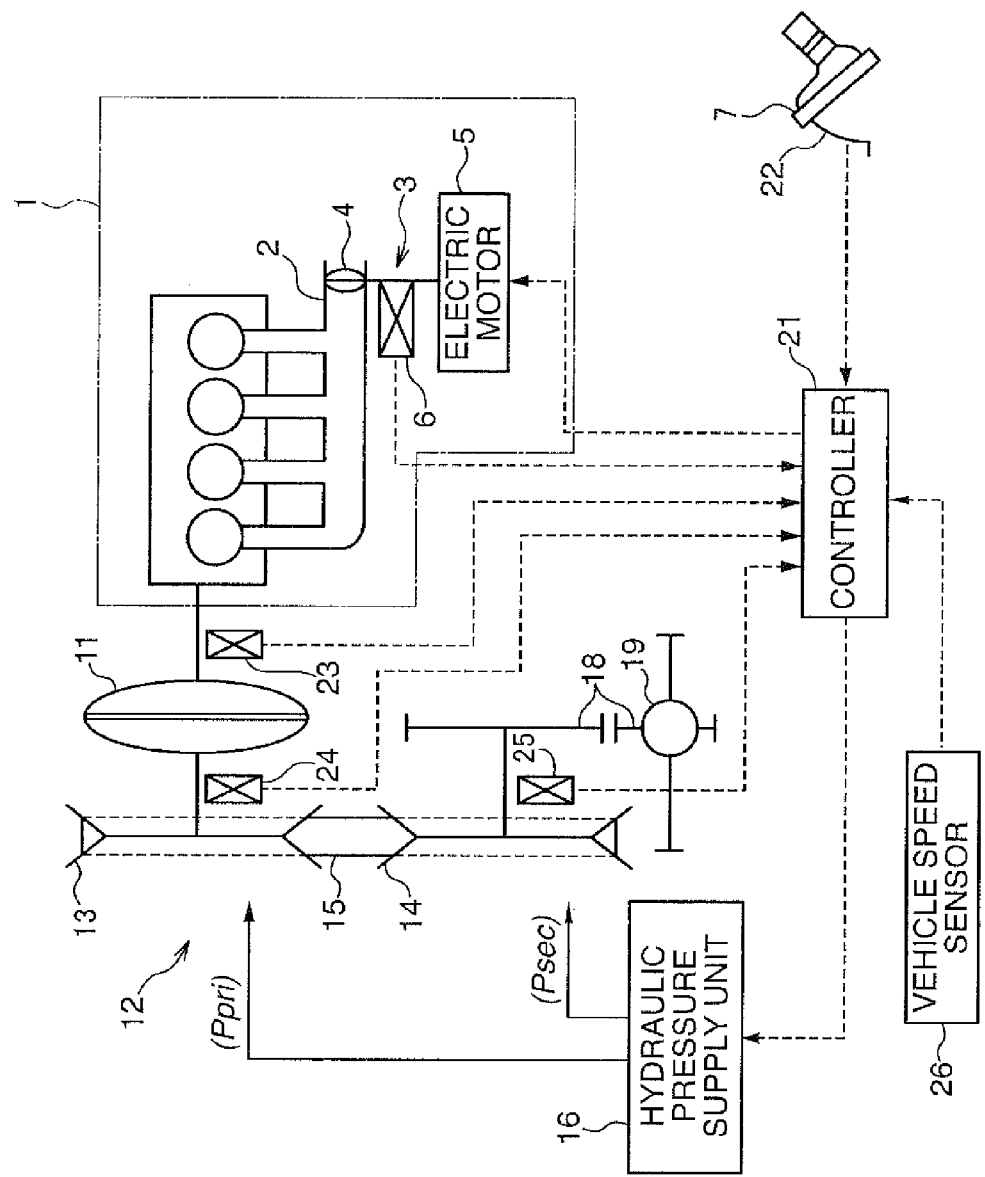
FIG. 1 is a schematic diagram showing a configuration of a drive force control device for a vehicle according to one or more embodiments of the present invention.

Embodiments of the present invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Referring to FIG. 1 of the drawings, an output of an internal combustion engine 1 of a vehicle is input into a continuously variable transmission (CVT) 12 via a torque converter 11. The CVT 12 comprises a primary pulley 13, a secondary pulley 14, and a V belt 15 wound around the primary pulley 13 and the secondary pulley 14. A contact radius by which the primary pulley 13 contacts the V belt 15 is varied by varying a groove width of the primary pulley 13 in accordance with a hydraulic pressure Ppri. A contact radius by which the secondary pulley 14 contacts the V belt 15 is varied by varying a groove width of the secondary pulley 14 in accordance with a hydraulic pressure Psec. As a result, a ratio between an input rotation speed and an output rotation speed, or in other words a gear ratio, of the CVT 12 is varied continuously in accordance with control of the hydraulic pressure Ppri and the hydraulic pressure Psec. The hydraulic pressure Ppri and the hydraulic pressure Psec are generated by a hydraulic pressure supply unit 16.

The secondary pulley 14 is joined to drive wheels via a final gear 18 and a differential 19.

The internal combustion engine 1 comprises an intake throttle device 3 that adjusts an intake air amount. The intake throttle device 3 comprises an intake throttle 4 provided in an intake passage 2 of the internal combustion engine 1, and an electric motor 5 that varies an opening of the intake throttle in response to an input signal.

The hydraulic pressure supply unit 16 and the intake throttle device 3 operate in response to command signals output by a controller 21.

The controller 21 is constituted by a microcomputer comprising a central processing unit (CPU), a read-only memory (ROM), a random access memory (RAM), and an input/output interface (I/O interface). The controller may be constituted by a plurality of microcomputers.

Detection signals from a throttle opening sensor 6 that detects a throttle opening of the intake throttle 4, an accelerator opening sensor 22 that detects an accelerator opening of an accelerator pedal 7 provided in the vehicle, an engine rotation speed sensor 23 that detects a rotation speed of the internal combustion engine 1, a primary pulley rotation speed sensor 24 that detects a rotation speed of the primary pulley 13, a secondary pulley rotation speed sensor 25 that detects a rotation speed of the secondary pulley 14, and a vehicle speed sensor 26 that detects a running speed of the vehicle are input respectively into the controller 21 in the form of signals.

The controller 21 controls a drive force of the vehicle by controlling the opening of the intake throttle 4 and performing speed change control on the CVT 12 via the hydraulic pressure supply unit 16 in accordance with these detection signals.

An outline of control executed by a drive force control device having the above configuration will now be described.

Figure 2:
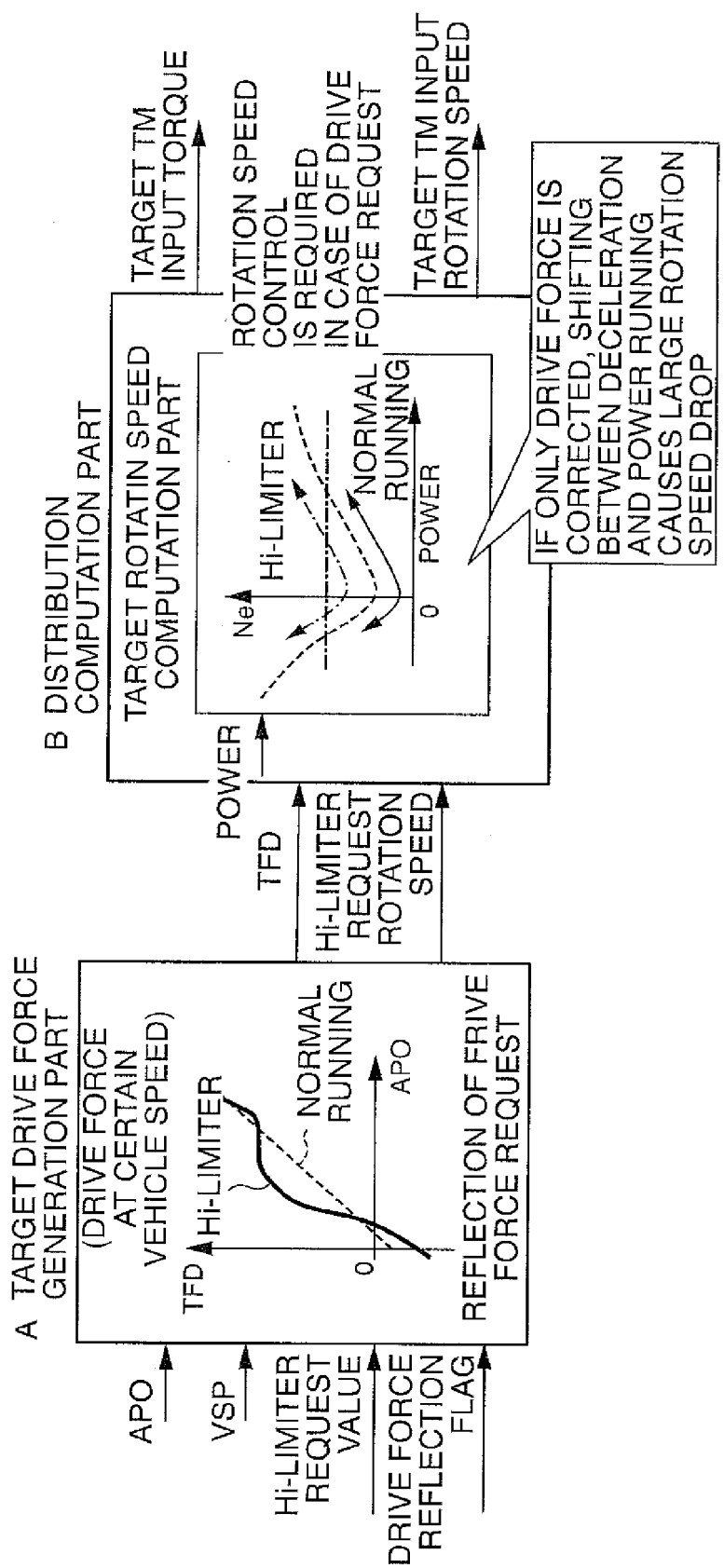
FIG. 2 is a block diagram illustrating functions of a target drive force generation part and a distribution computation part provided in the drive force control device.

Referring to FIG. 2, the controller 21 comprises a target drive force generation part A and a distribution computation part B. The target drive force generation part A determines a target drive force TFD based on a normal target drive force, which is indicated by a dotted line, on the basis of input signals indicating an accelerator opening APO, a vehicle speed VSP, and so on, and when a sport mode request or an excess drive force request is issued, determines a target drive force TFD for use during Hi-limiter application, which is indicated by a solid line. The distribution computation part B calculates a target transmission (TM) input torque and a target TM input rotation speed of the CVT 12 at which the target drive force is obtained.

Referring to a diagram illustrated in the block of the distribution computation part B, an output applied to the vehicle is increased by increasing the engine rotation speed. This is not limited to a case in which a positive output is applied during acceleration, and occurs likewise when a negative output is applied during deceleration. In other words, likewise during deceleration, a larger engine brake force can be obtained by increasing the engine rotation speed. Further, this diagram is set such that the engine rotation speed is at a minimum when the output applied to the vehicle is zero in both an acceleration direction and a deceleration direction.

When a vehicle deceleration state accompanying engine braking shifts to a vehicle acceleration state, the controller 21 according to one or more embodiments of the present invention prevents a rotation speed reduction during re-acceleration by correcting the target input rotation speed of the CVT 12 in a vehicle non-deceleration state on the basis of the target input rotation speed of the CVT 12 in the vehicle deceleration state.

Referring to FIGS. 3-24, drive force control executed by the controller 21 for this purpose will be described. It should be noted that respective blocks shown in FIGS. 3-19 and FIGS. 21-24 depict respective functions of the controller 21 as imaginary units that do not exist physically.

Figure 3:
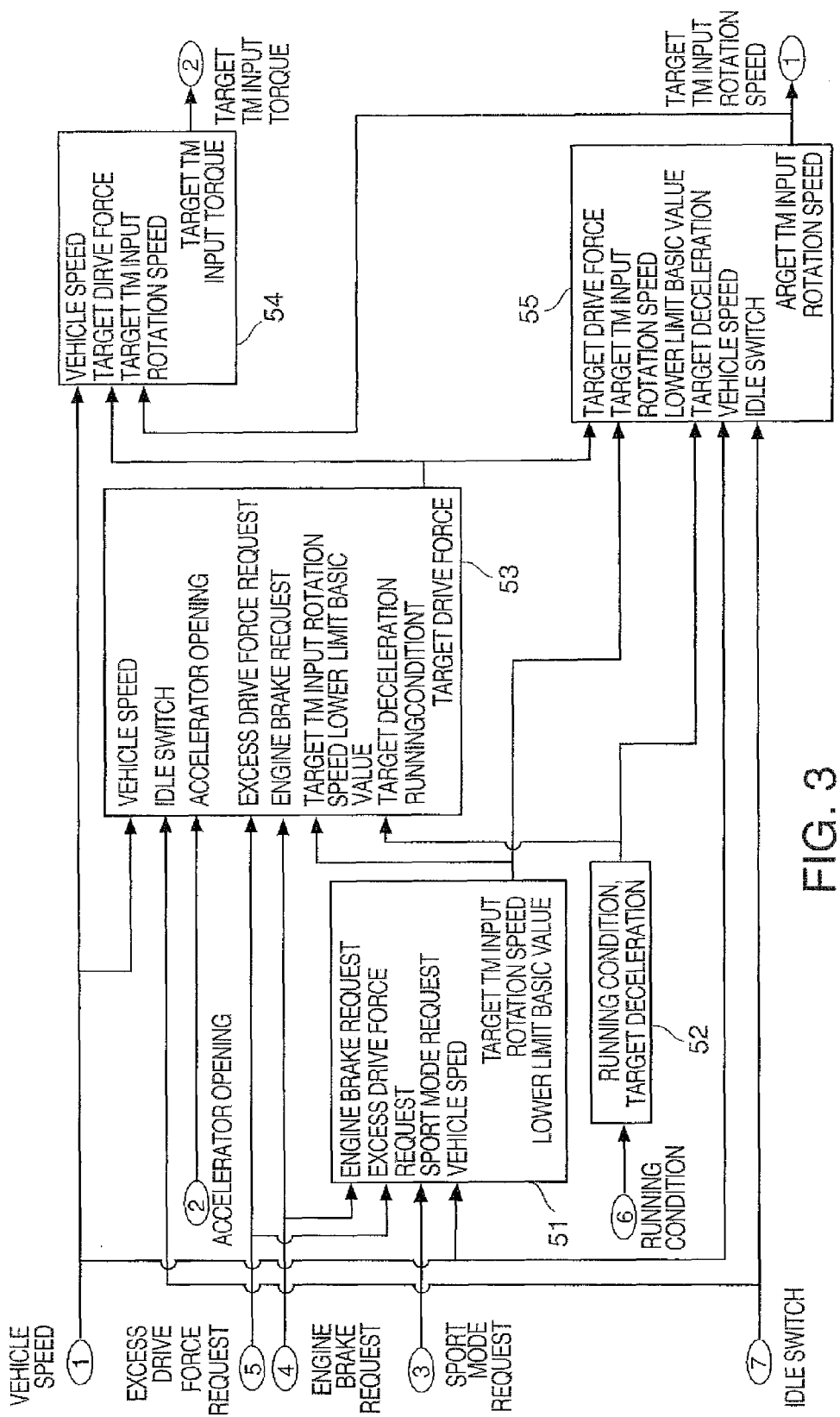
FIG. 3 is a block diagram illustrating configurations of the target drive force generation part and the distribution computation part.

Referring to FIG. 3, the target drive force generation part A of FIG. 2 is constituted by a target TM input rotation speed lower limit basic value computation part 51, a target deceleration computation part 52, and a target drive force computation part 53. The distribution computation part B is constituted by a target TM input torque computation part 54 and a target TM input rotation speed computation part 55. The controller 21 controls the intake throttle device (ETC) 3 and the CVT 12 on the basis of these configurations.

First, individual configurations of the target drive force generation part A will be described.

Figure 4:
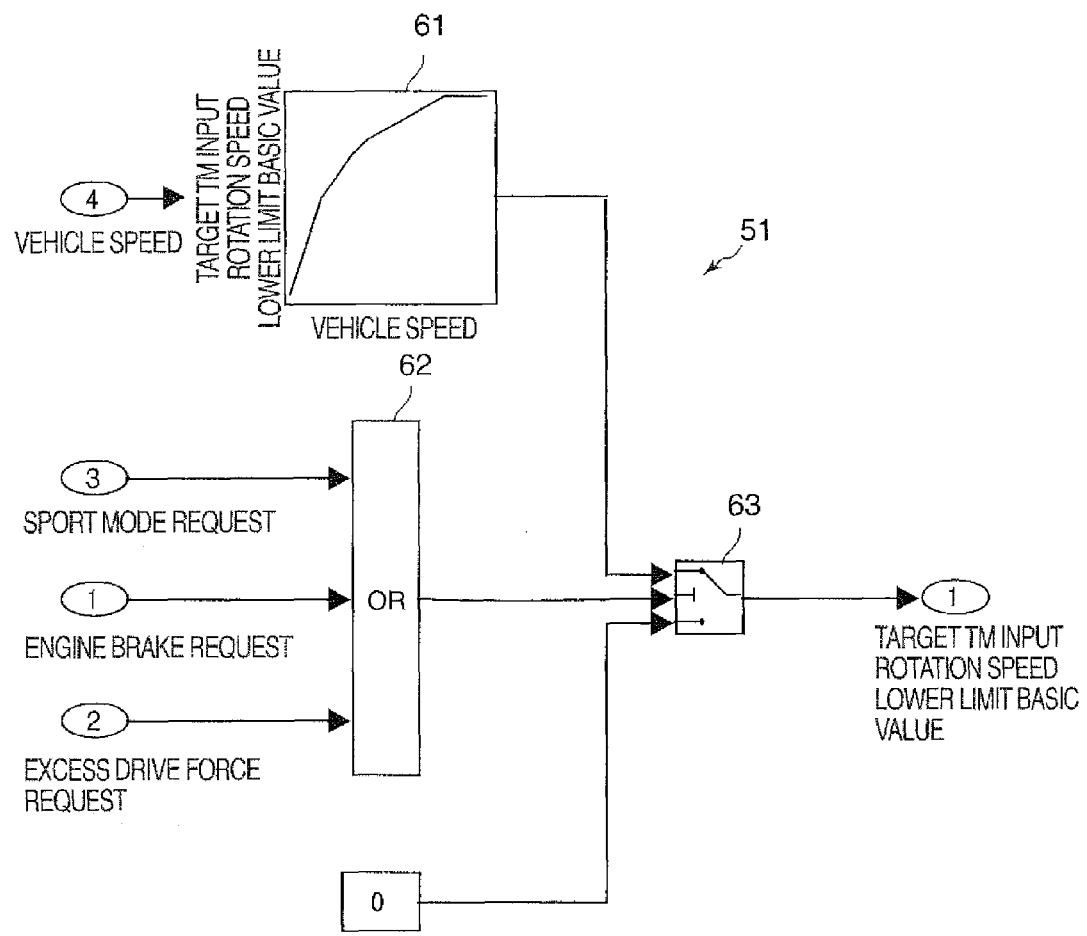
FIG. 4 is a block diagram illustrating a configuration of a target transmission (TM) input rotation speed lower limit basic value computation part provided in the target drive force generation part.

Referring to FIG. 4, the target TM input rotation speed lower limit basic value computation part 51 shown in FIG. 3 comprises a target TM input rotation speed lower limit basic value search part 61, an OR circuit 62, and a switch 63.

The target TM input rotation speed lower limit basic value search part 61 retrieves a target TM input rotation speed lower limit basic value from the vehicle speed VSP by referring to a map stored in advance in the ROM. The OR circuit 62 outputs an ON signal to the switch 63 when any one of a sport mode request, an engine brake request, and an excess drive force request has been issued.

The sport mode request is switched ON when a driver operates a switch attached to a shift lever of the vehicle. The engine brake request is issued to boost engine braking, and is switched ON when the shift lever enters an L range, for example.

The excess drive force request is switched ON on the basis of information from a navigation system with the aim of improving a drive force response to an accelerator operation while travelling on a winding road, for example.

When any one of these requests is ON, the OR circuit 62 switches the switch 63 from zero to the target TM input rotation speed lower limit basic value determined by the target TM input rotation speed lower limit basic value search part 61. When all of the requests input into the OR circuit 62 are OFF, the OR circuit 62 switches the switch 63 from the target TM input rotation speed lower limit basic value to zero.

Figure 5:
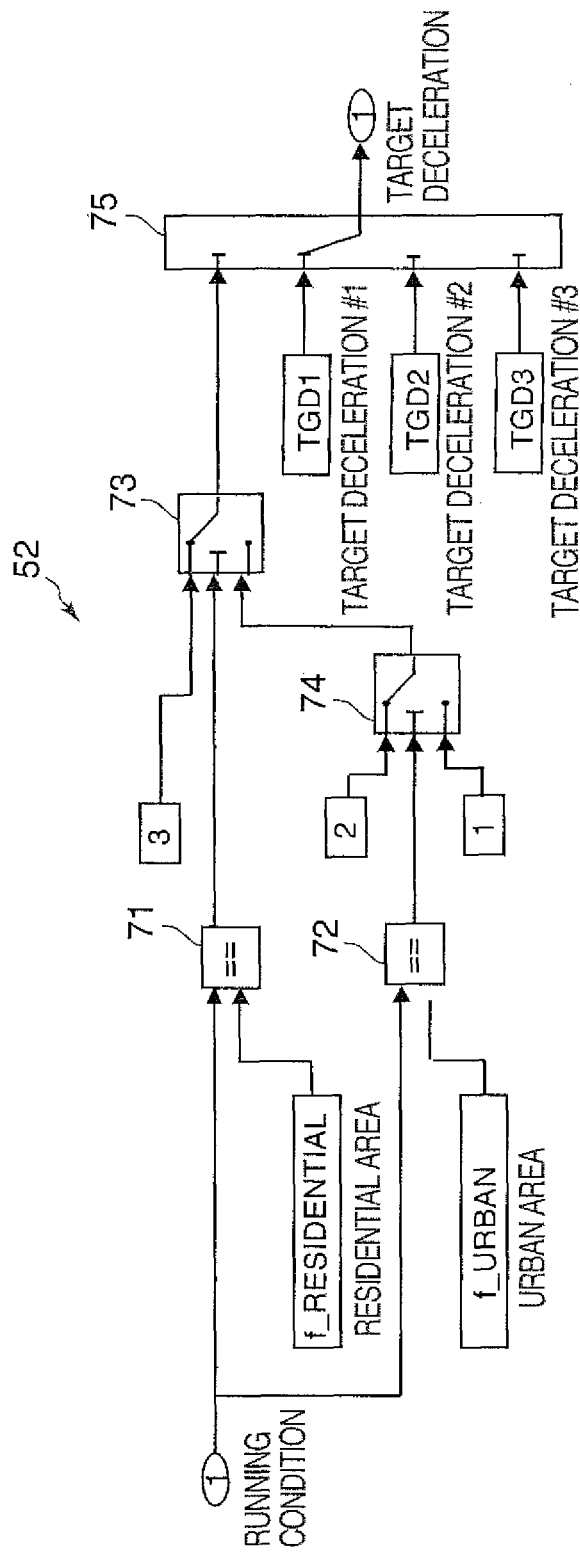
FIG. 5 is a block diagram illustrating a configuration of a target deceleration computation part provided in the target drive force generation part.

Referring to FIG. 5, the target deceleration computation part 52 shown in FIG. 3 comprises determining units 71, 72, switches 73, 74, and a selector 75. The determining unit 71 determines whether or not a current running environment of the vehicle corresponds to a residential area. The determining unit 71 outputs ON when the current running environment of the vehicle corresponds to a residential area, and outputs OFF otherwise.

The determining unit 72 determines whether or not a current running environment of the vehicle corresponds to an urban area. The determining unit 72 outputs ON when the current running environment of the vehicle corresponds to an urban area, and outputs OFF otherwise.

The switch 74 outputs a numerical value of 2 when the output of the determining unit 72 is ON, and outputs a numerical value of 1 when the output of the determining unit 71 is OFF.

The switch 73 outputs a numerical value of 3 when the output of the determining unit 71 is ON, and outputs the output value of the switch 74 when the output of the determining unit 71 is OFF.

The selector 75 outputs a target deceleration having a number that corresponds to an input value from the switch 73. More specifically, when the input value from the switch 73 is 1, the selector 75 outputs TGD1 serving as a target deceleration #1. When the input value from the switch 73 is 2, the selector 75 outputs TGD2 serving as a target deceleration #2. When the input value from the switch 73 is 3, the selector 75 outputs TGD3 serving as a target deceleration #3.

The target deceleration computation part 52 classifies the current running environment of the vehicle into one of three types, namely a residential area, an urban area, and another type of area, as described above, and outputs a target deceleration corresponding to the running environment. The other type of area includes a suburban area. The set deceleration decreases in order of the residential area, the urban area, and the other type of area.

Figure 6:
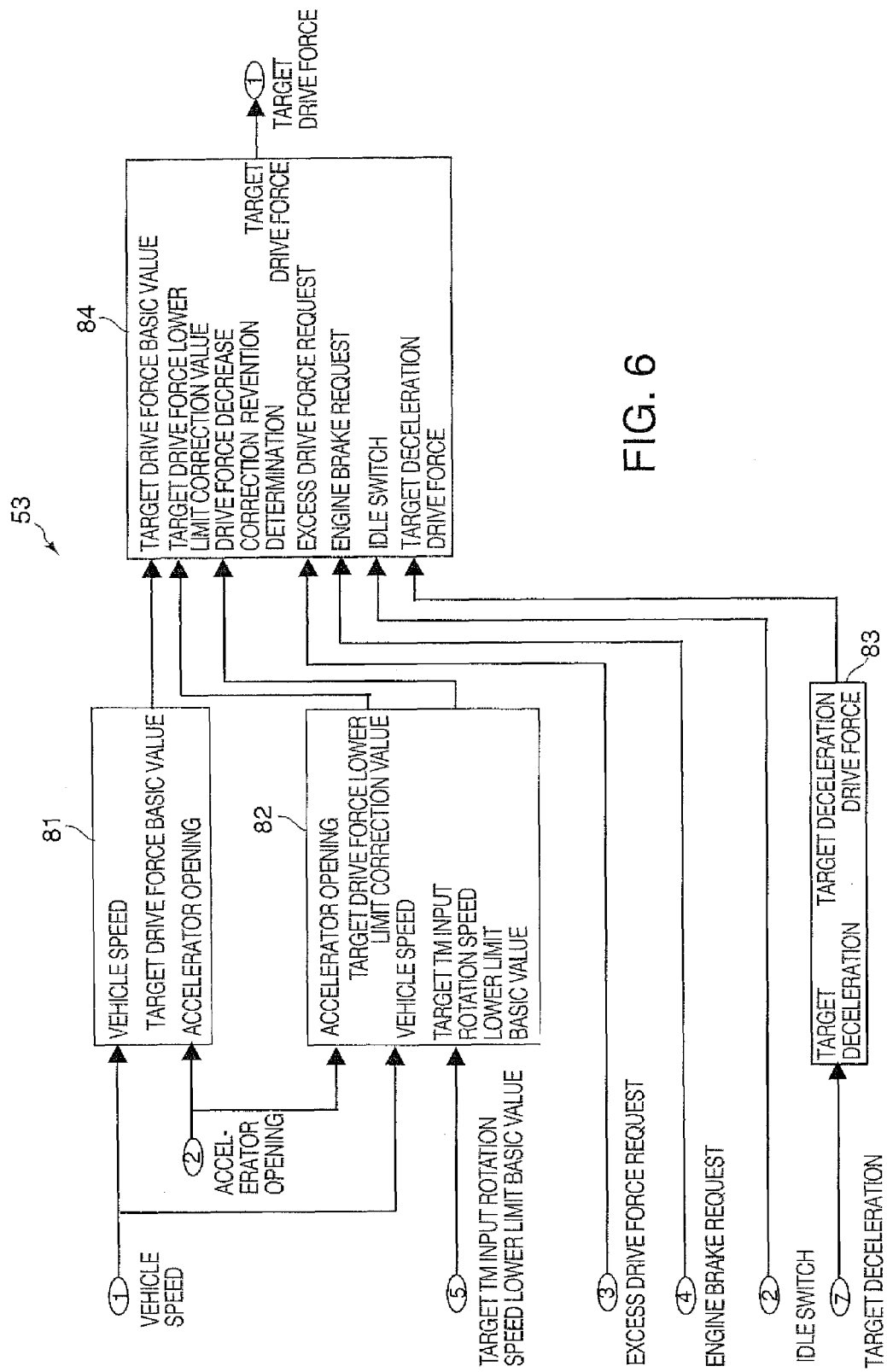
FIG. 6 is a block diagram illustrating a configuration of a target drive force computation part provided in the target drive force generation part.

Referring to FIG. 6, the target drive force computation part 53 shown in FIG. 3 comprises a target drive force basic value search part 81, a target drive force lower limit correction value computation part 82, a target deceleration drive force computation part 83, and a target drive force lower limit correction part 84.

Figure 7:
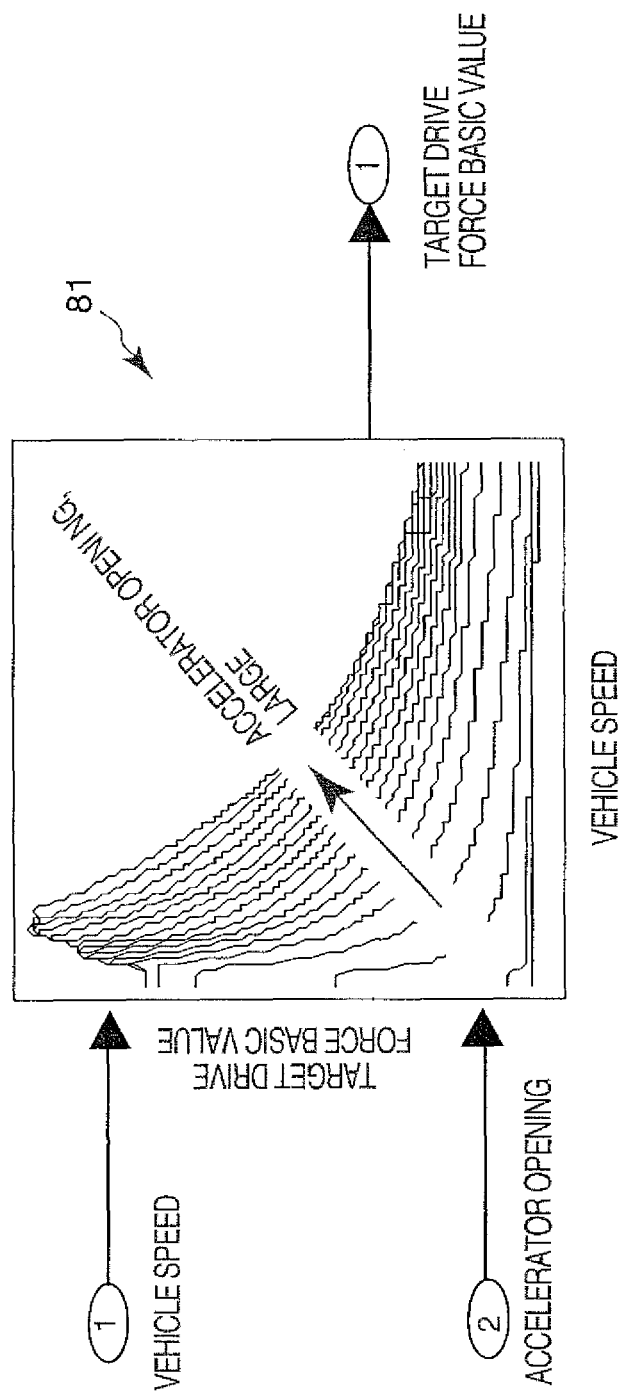
FIG. 7 is a block diagram illustrating a configuration of a target drive force basic value search part provided in the target drive force computation part.

Referring to FIG. 7, the target drive force basic value search part 81 outputs a target drive force basic value of the vehicle from the vehicle speed and the accelerator opening by referring to a conventional map stored in advance in the ROM.

Figure 8:
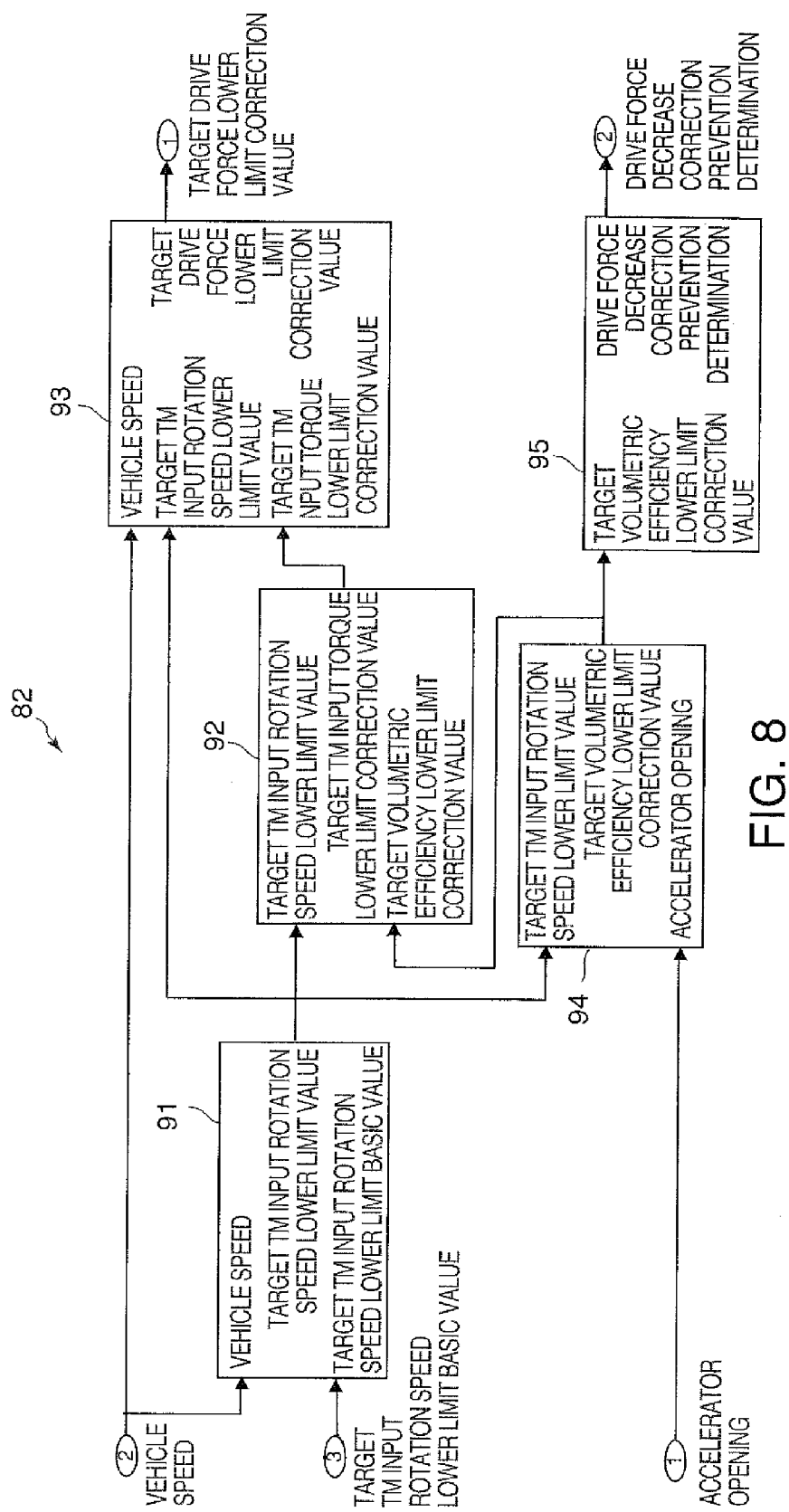
FIG. 8 is a block diagram illustrating a configuration of a target drive force lower limit correction value computation part provided in the target drive force computation part.

Referring to FIG. 8, the target drive force lower limit correction value computation part 82 is constituted by a target TM input rotation speed lower limit value computation part 91, a target TM input torque lower limit correction value computation part 92, a target drive force lower limit correction value computation part 93, a target volumetric efficiency lower limit correction value computation part 94, and a drive force decrease correction prevention determining part 95.

Figure 9:
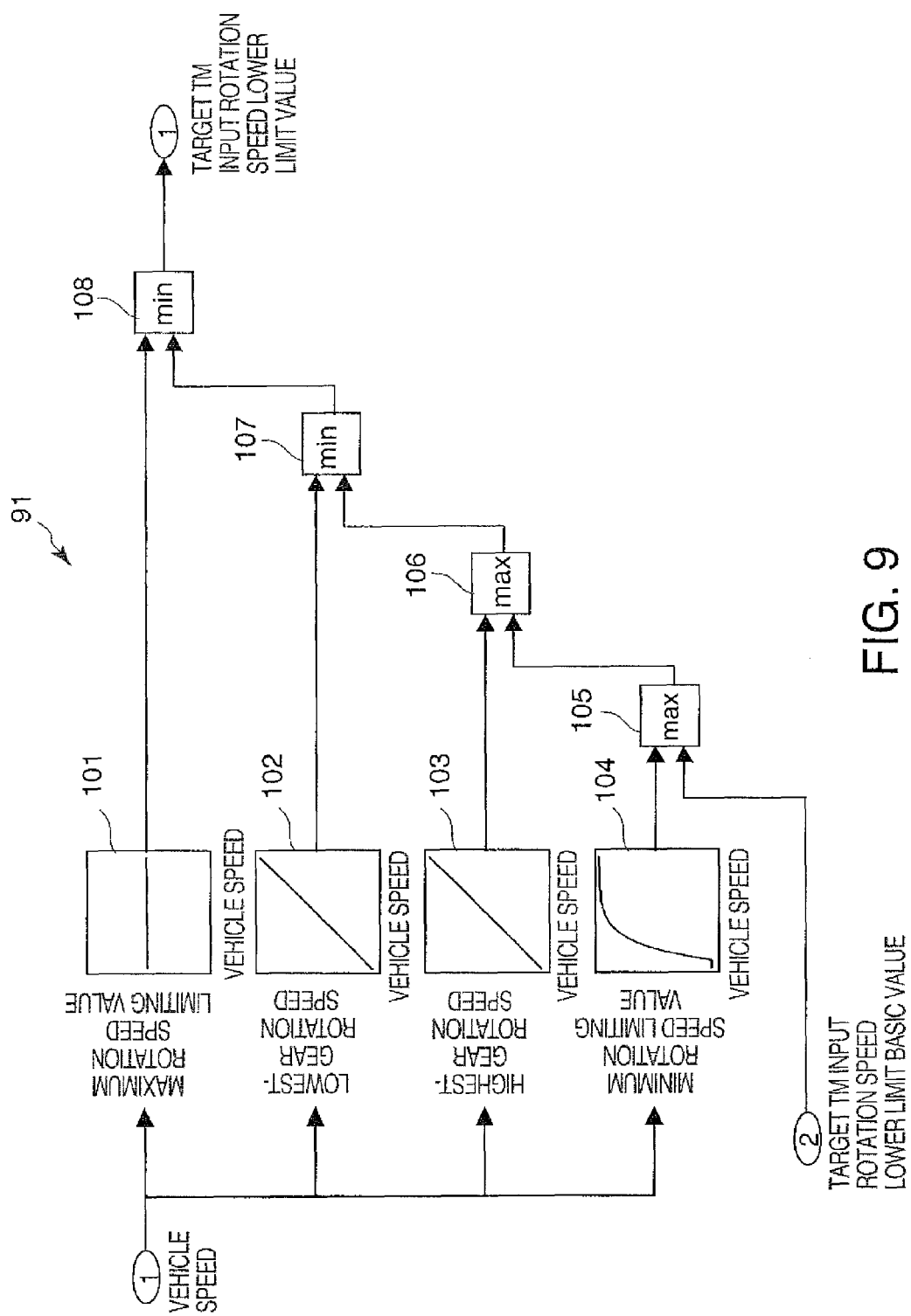
FIG. 9 is a block diagram illustrating a configuration of a target TM input rotation speed lower limit value computation part provided in the target drive force lower limit correction value computation part.

Referring to FIG. 9, the target TM input rotation speed lower limit value computation part 91 comprises a maximum rotation speed limiting value computation part 101, a lowest-gear rotation speed computation part 102, a highest-gear rotation speed computation part 103, a minimum rotation speed limiting value computation part 104, maximum value output circuits 105 and 106, and minimum value output circuits 107 and 108.

The maximum rotation speed limiting value computation part 101 sets a maximum rotation speed limiting value from a maximum rotation speed of the internal combustion engine 1. The lowest-gear rotation speed computation part 102 computes a speed change rotation speed corresponding to a lowest gear ratio of the CVT 12 from the vehicle speed and the lowest gear ratio. The highest-gear rotation speed computation part 103 computes a speed change rotation speed corresponding to a highest gear ratio of the CVT 12 from the vehicle speed and the highest gear ratio. The minimum rotation speed limiting value computation part 104 sets a minimum rotation speed limiting value from a minimum rotation speed of the internal combustion engine 1.

The maximum value output circuit 105 compares the target TM input rotation speed lower limit basic value calculated by the target TM input rotation speed lower limit basic value computation part 51 with the minimum rotation speed limiting value, and outputs the larger thereof. In other words, a lower limit of the target TM input rotation speed lower limit basic value is limited by the minimum rotation speed limiting value.

The maximum value output circuit 106 compares the output of the maximum value output circuit 105 with the highest-gear rotation speed, and outputs the larger thereof. In other words, a lower limit of the output of the maximum value output circuit 105 is limited by the highest-gear rotation speed.

The minimum value output circuit 107 compares the output of the maximum value output circuit 106 with the lowest-gear rotation speed, and outputs the smaller thereof. In other words, an upper limit of the maximum value output circuit 106 is limited by the lowest-gear rotation speed. The minimum value output circuit 108 compares the output of the minimum value output circuit 107 with the maximum rotation speed limiting value, and outputs the smaller thereof. In other words, an upper limit of the minimum value output circuit 107 is limited by the maximum rotation speed limiting value.

Hence, the target TM input rotation speed lower limit value computation part 91 outputs a value to which limitations based on specifications of the internal combustion engine 1 and the CVT 12 have been added as the target TM input rotation speed lower limit value.

Figure 10:
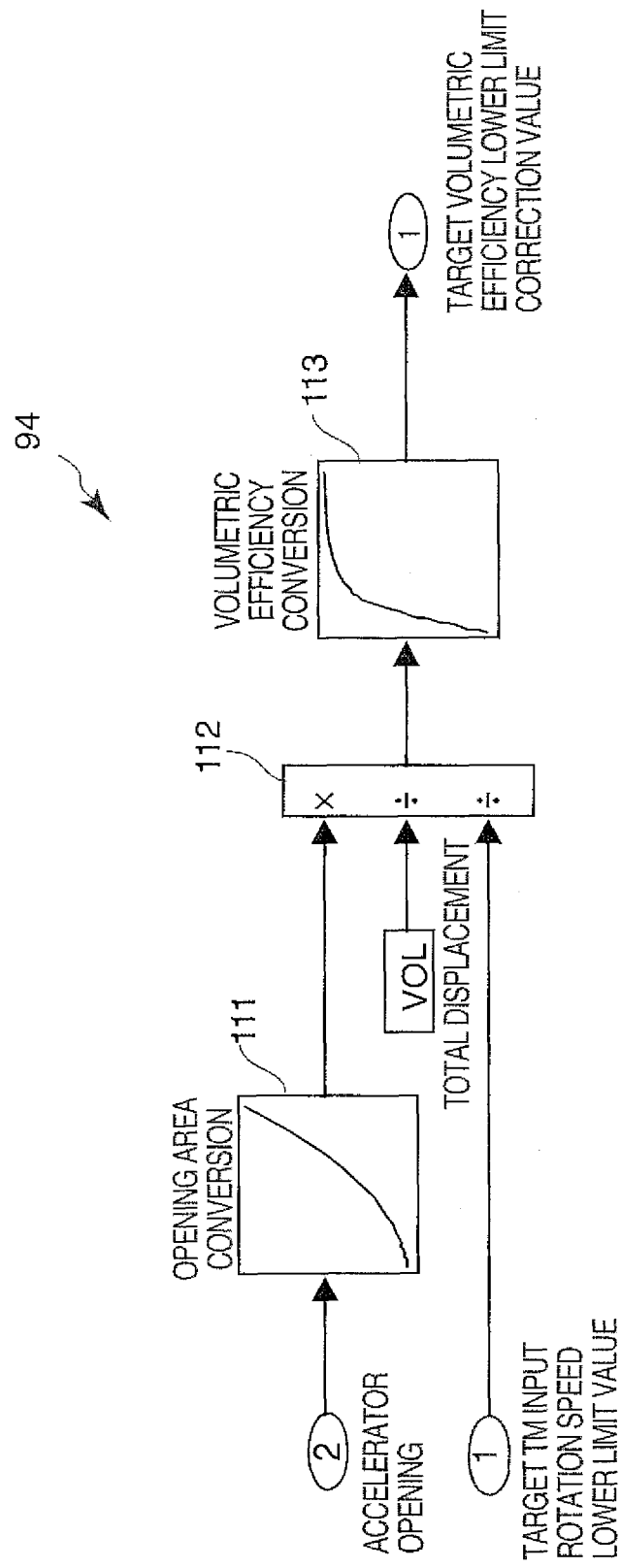
FIG. 10 is a block diagram illustrating a configuration of a target volumetric efficiency lower limit correction value computation part provided in the target drive force lower limit correction value computation part.

Referring to FIG. 10, the target volumetric efficiency lower limit correction value computation part 94 is constituted by an opening area conversion part 111, a multiplication/division computation part 112, and a volumetric efficiency conversion part 113.

The opening area conversion part 111 converts the accelerator opening into an opening area. The multiplication/division computation part 112 calculates an accelerator required opening area per unit exhaust gas amount and per unit rotation from the opening area, a total exhaust gas amount of the internal combustion engine 1, and the target TM input rotation speed lower limit value calculated by the target TM input rotation speed lower limit value computation part 91. The volumetric efficiency conversion part 113 converts the calculated accelerator required opening area into a volumetric efficiency, and outputs an obtained value as a target volumetric efficiency lower limit correction value.

With respect to the above calculations performed by the target volumetric efficiency lower limit correction value computation part 94, the content of Japanese Patent No. 3541661 is incorporated herein by reference. In particular, paragraphs 0019 to 0050 of this document may describe the effects of one or more embodiments of the invention in detail.

It should be noted that the total exhaust gas amount of the internal combustion engine 1 is a known, constant value, and therefore the target volumetric efficiency lower limit correction value can be determined directly by storing a three-dimensional map of the target volumetric efficiency lower limit correction value having the opening area and the target TM input rotation speed lower limit value as parameters in advance in the ROM, and searching the map using the opening area and the target TM input rotation speed lower limit value.

Figure 11:
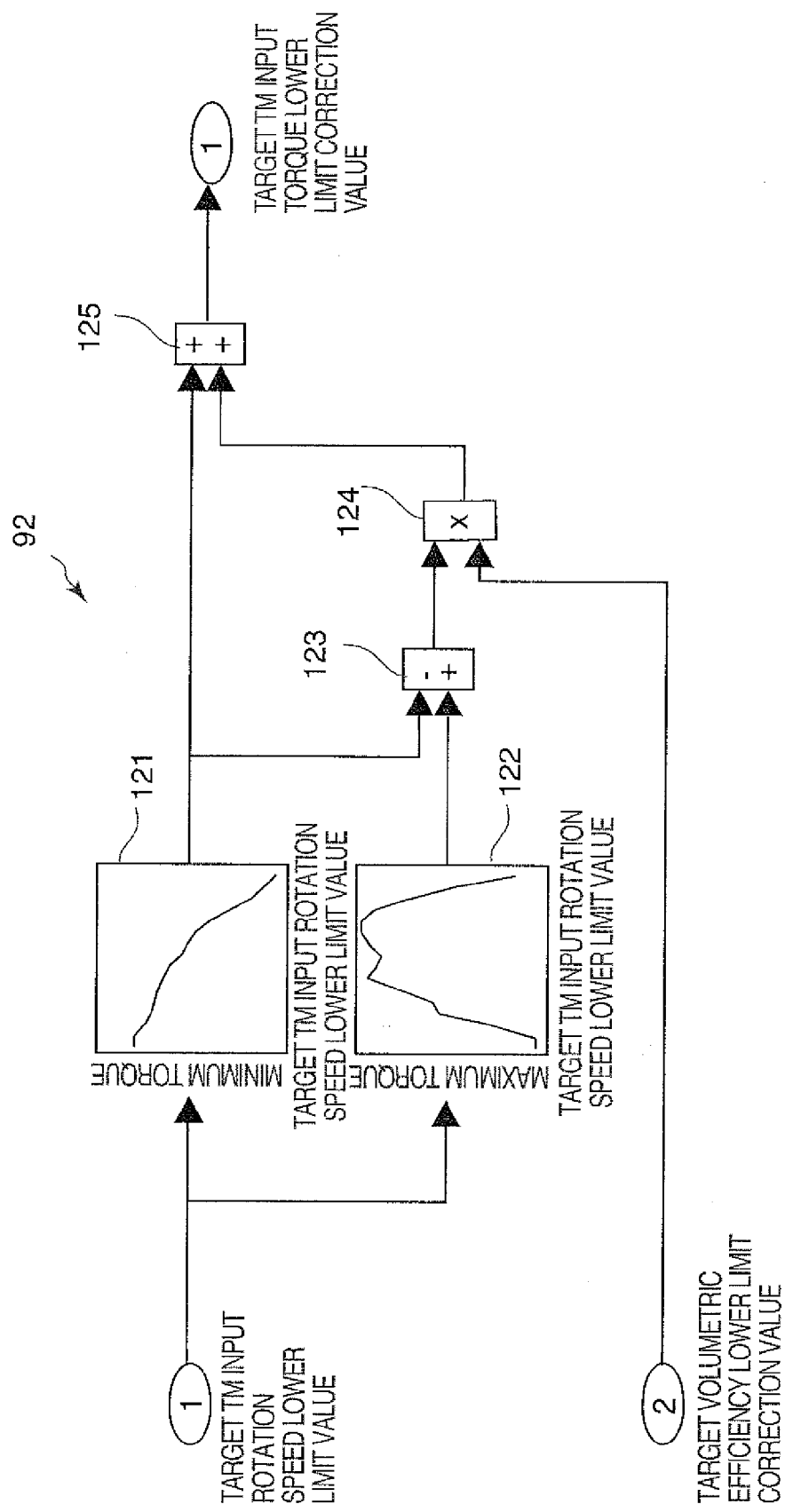
FIG. 11 is a block diagram illustrating a configuration of a target TM input torque lower limit correction value computation part provided in the target drive force lower limit correction value computation part.

Referring to FIG. 11, the target TM input torque lower limit correction value computation part 92 comprises a minimum torque computation part 121 that determines a minimum value of an input torque input into the CVT 12 from the target TM input rotation speed lower limit value, a maximum torque computation part 122 that determines a maximum value of the input torque input into the CVT 12 in an identical manner, a subtracter 123 that determines a difference between the maximum value and the minimum value of the input torque, a multiplier 124 that multiplies the target volumetric efficiency lower limit correction value calculated by the target volumetric efficiency lower limit correction value computation part 94 by the input torque difference, and an adder 125 that adds the minimum torque to an output of the multiplier 124.

The configuration of the target TM input torque lower limit correction value computation part 92 in FIG. 11 illustrates a simplified calculation method using the fact that the volumetric efficiency and the engine torque have a linear relationship. In other words, the multiplier 124 calculates a correction amount to be added to the minimum value of the input torque by multiplying the target volumetric efficiency lower limit correction value by the input torque difference, and the adder 125 calculates the target TM input torque lower limit correction value by adding the correction amount to the minimum value of the input torque.

The engine torque is determined univocally from the engine rotation speed and the volumetric efficiency, and therefore the target TM input torque lower limit correction value can likewise be determined directly by storing a three-dimensional map of the target TM input torque lower limit correction value having the engine rotation speed and the volumetric efficiency as parameters in advance in the ROM, and searching the map using the engine rotation speed and the volumetric efficiency.

Figure 12:
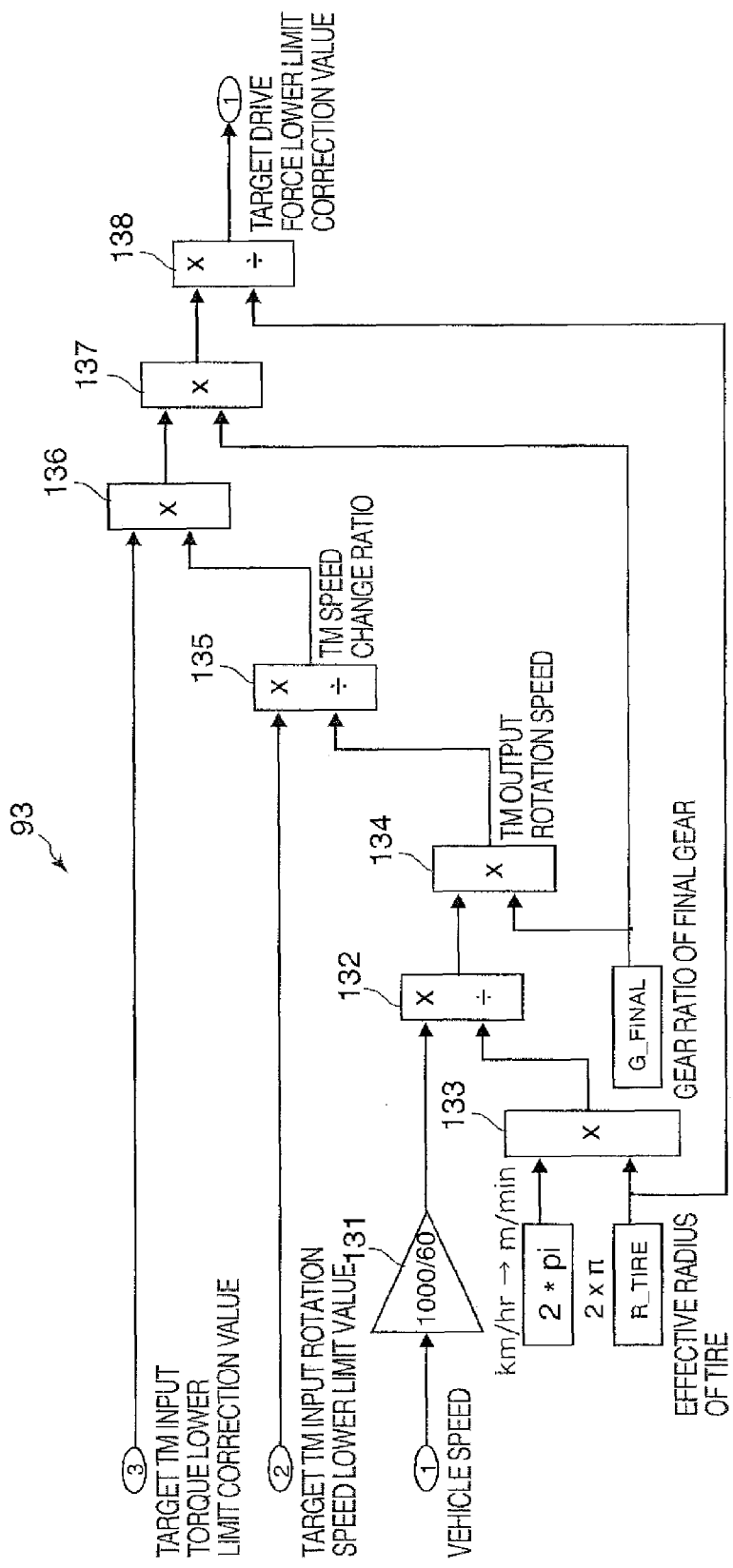
FIG. 12 is a block diagram illustrating a configuration of the target drive force lower limit correction value computation part provided in the target drive force lower limit correction value computation part.

Referring to FIG. 12, the target drive force lower limit correction value computation part 93 comprises a unit converter 131, dividers 132, 135, 138, and multipliers 133, 134, 136, 137.

The unit converter 131 converts the vehicle speed into m/min units. The multiplier 133 calculates a circumferential distance of a tire from a diameter of the tire. The divider 132 calculates a rotation speed of the tire from the vehicle speed and the circumferential distance of the tire. The multiplier 134 calculates the output rotation speed of the CVT 12 by multiplying a gear ratio of the final gear 18 provided between the CVT 12 and the drive wheel of the vehicle by the rotation speed of the tire. The divide 135 converts the target TM input rotation speed lower limit value into a target gear ratio of the CVT 12 by dividing the target TM input rotation speed lower limit value by the output rotation speed of the CVT 12.

The multiplier 136 calculates a target output torque lower limit correction value of the CVT 12 by multiplying the target gear ratio of the CVT 12 by the target TM input torque lower limit correction value. The multiplier 137 calculates a final torque correction value by multiplying a final gear ratio by the target output torque lower limit correction value, and the divider 138 calculates the target drive force lower limit correction value by dividing the final torque correction value by an effective tire radius R_TIRE.

Figure 13:
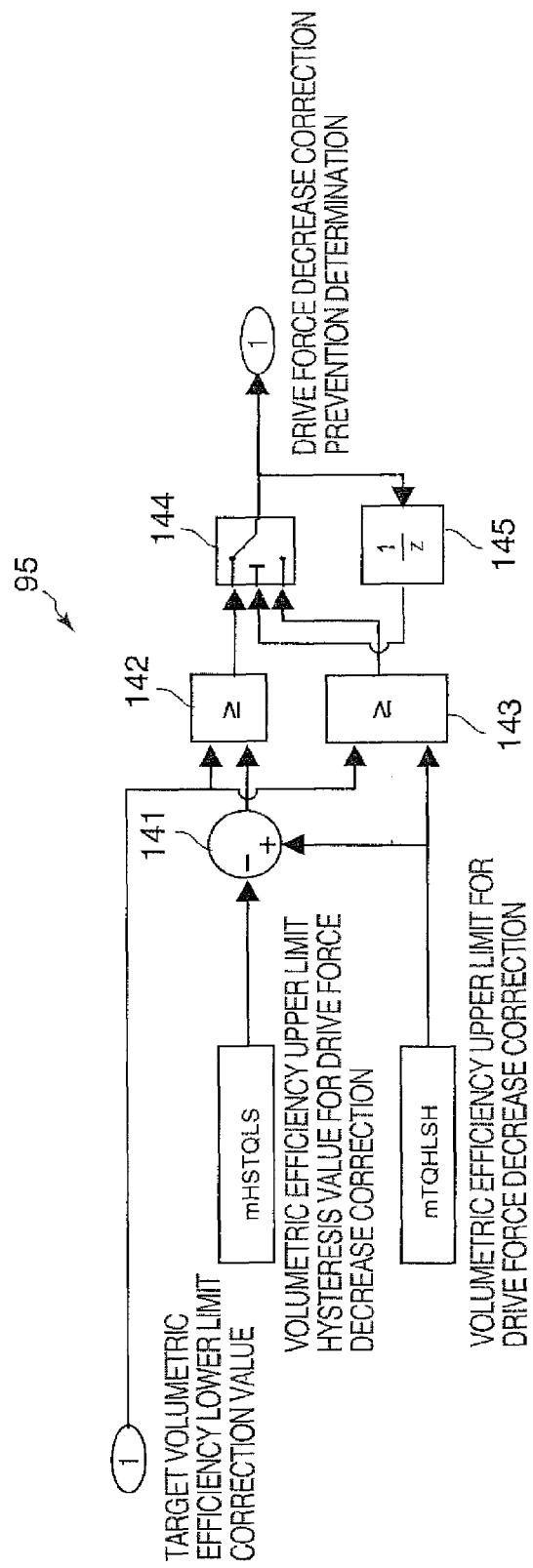
FIG. 13 is a block diagram illustrating a configuration of a drive source decrease correction prevention determining part provided in the target drive force lower limit correction value computation part.

Referring to FIG. 13, the drive force decrease correction prevention determining part 95 comprises a subtracter 141, comparators 142 and 143, a switch 144, and a delay unit 145. The subtracter 141 inputs a value obtained by subtracting a hysteresis value mTQHLSH from a drive force decrease correction implementation upper limit volumetric efficiency mTQHLSH into the comparator 142 as a comparison subject value. The comparator 142 determines whether or not the target volumetric efficiency lower limit correction value output by the volumetric efficiency conversion part 113 equals or exceeds the comparison subject value, and inputs a determination result into the switch 144 in the form of a Boolean value indicating YES/NO.

The comparator 143, meanwhile, determines whether or not the target volumetric efficiency lower limit correction value output by the volumetric efficiency conversion part 113 equals or exceeds the drive force decrease correction implementation upper limit volumetric efficiency mTQHLSH, and outputs a determination result to the switch 144 in the form of a Boolean value indicating YES/NO. The switch 144 switches between the input value from the comparator 142 and the input value from the comparator 143 using a previous drive force decrease correction prevention determination result input via the delay unit 145 as a trigger.

To summarize the content of processing performed by the drive force decrease correction prevention determining part 95, basically, a determination is made as to whether or not the target volumetric efficiency lower limit correction value output by the volumetric efficiency conversion part 113 equals or exceeds the drive force decrease correction implementation upper limit volumetric efficiency mTQHLSH, and when the determination is affirmative, a drive force decrease correction is prevented. In other words, to ensure that a driving force decrease correction is performed only during deceleration in a low load state, a determination as to whether or not a load equals or exceeds a medium load is made using the volumetric efficiency, and in a region where the load equals or exceeds a medium load, the drive force decrease correction is prevented.

It should be noted, however, that when the target volumetric efficiency lower limit correction value equals or exceeds the drive force decrease correction implementation upper limit volumetric efficiency mTQHLSH after taking hysteresis into account, prevention of the drive force decrease correction is not canceled until the target volumetric efficiency lower limit correction value falls below the comparison subject value obtained by subtracting the hysteresis value mTQHLSH from the drive force decrease correction implementation upper limit volumetric efficiency mTQHLSH.

Figure 14:
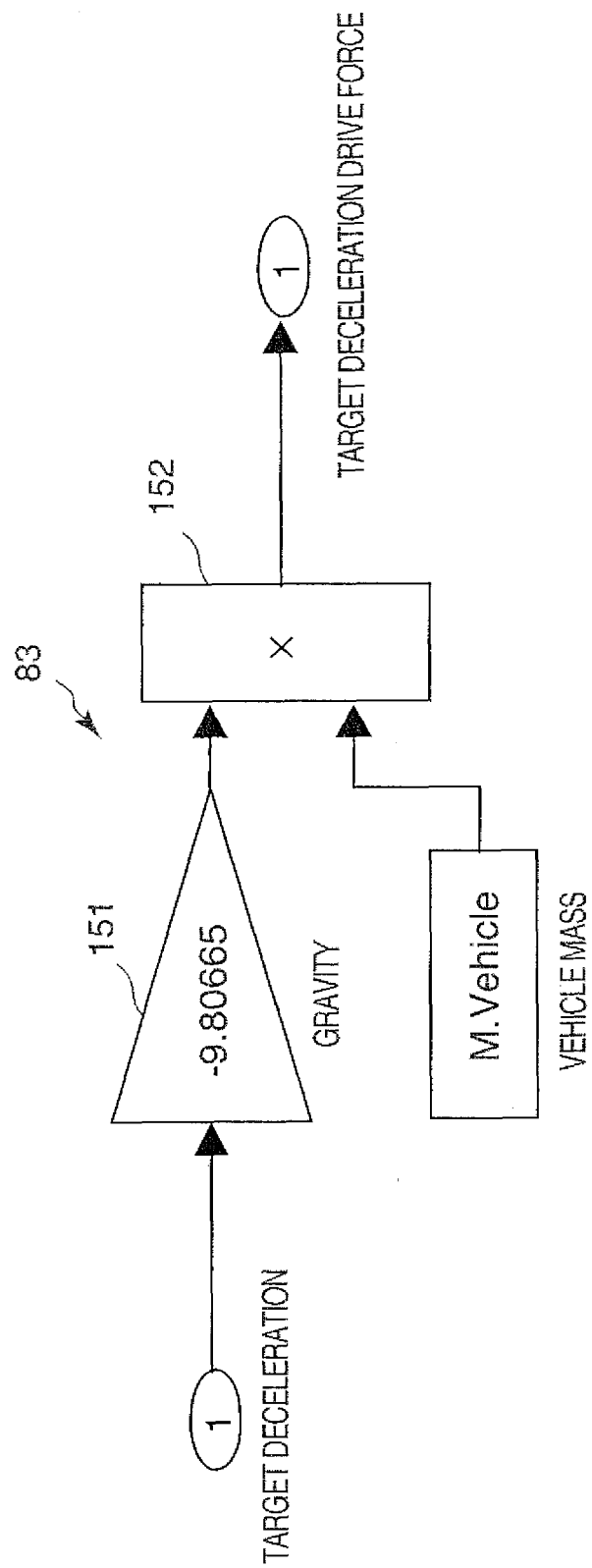
FIG. 14 is a block diagram illustrating a configuration of a target deceleration drive force computation part provided in the target drive force computation part.

Referring to FIG. 14, the target deceleration drive force computation part 83 of FIG. 6 comprises a unit converter 151 that multiplies a gravitational acceleration by the target deceleration output by the target deceleration computation part 52, and a multiplier 152 that computes a target deceleration drive force by multiplying a vehicle mass by an output of the unit converter 151. Here, a unit of the target deceleration is a gravitational constant (G), and a unit of the target deceleration drive force is newtons (N).

Figure 15:
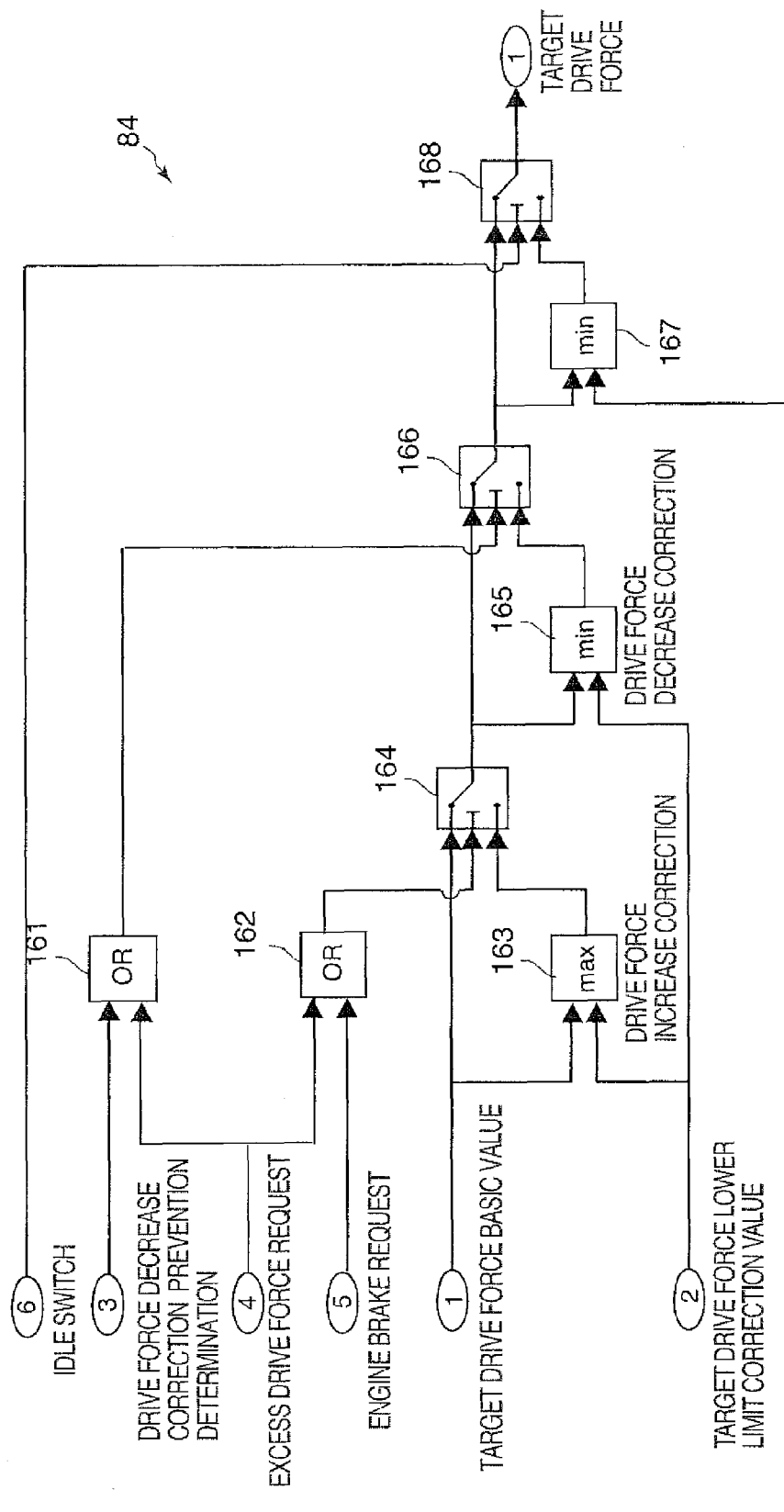
FIG. 15 is a block diagram illustrating a configuration of a target drive force lower limit correction part provided in the target drive force computation part.

Referring to FIG. 15, the target drive force lower limit correction part 84 of FIG. 6 comprises OR circuits 161 and 162, a maximum value output circuit 163, switches 164, 166, 168, and a minimum value output circuit 165.

The OR circuit 161 outputs an ON signal when one of the drive force decrease correction prevention determination result output by the drive force decrease correction prevention determining part 95 and the excess drive force request illustrated in FIG. 4 is ON. The OR circuit 162 outputs an ON signal when one of the excess drive force request and the engine brake request is ON. The maximum value output circuit 163 outputs the larger of the target drive force basic value output by the target drive force basic value search part 81 and the target drive force lower limit correction value output by the target drive force lower limit correction value computation part 93.

The switch 164 outputs the target drive force basic value when the output of the OR circuit 162 is ON, and outputs the output value of the maximum value output circuit 163 when the output of the OR circuit 162 is OFF. The minimum value output circuit 165 outputs the smaller of the output of the switch 164 and the target drive force lower limit correction value. The switch 166 outputs the output value of the switch 164 when the output of the OR circuit 161 is ON, and outputs the output value of the minimum value output circuit 165 when the output of the OR circuit 161 is OFF.

The minimum value output circuit 167 outputs the smaller of the output value of the switch 166 and the target deceleration drive force of FIG. 14. The switch 168 outputs the output value of the switch 166 as a target drive force when an idle switch is ON, and outputs the output of the minimum value output circuit 167 as the target drive force when the idle switch is OFF. The idle switch outputs an ON signal when the accelerator pedal is not depressed, and outputs an OFF signal otherwise.

To summarize the above, the target drive force lower limit correction part 84 prevents a drive force increase correction, which is a function of the circuit 163, when the excess drive force request or the engine brake request has been issued. When the drive force decrease correction is prevented or when the excess drive force request has been issued, the target drive force lower limit correction part 84 prevents the drive force decrease correction, which is a function of the circuit 165. As a result, both the drive force increase correction and the drive force decrease correction are prevented when the excess drive force request is issued.

In this case, the engine rotation speed alone is corrected to the increase side in a separate routine, resulting in an increase in excess drive force. When the excess drive force request has not been issued but the engine brake request has been issued, correction of the drive force to the increase side is prevented. When the sport mode is selected in a condition where the drive force decrease correction is not prevented and neither the excess drive force request nor the engine brake request has been issued, the drive force increase correction and the drive force decrease correction are both implemented.

Next, the configuration of the distribution computation part B shown in FIG. 2 will be described. As described above, the distribution computation part B is constituted by the target TM input torque computation part 54 and the target TM input rotation speed computation part 55 shown in FIG. 3.

Figure 16:
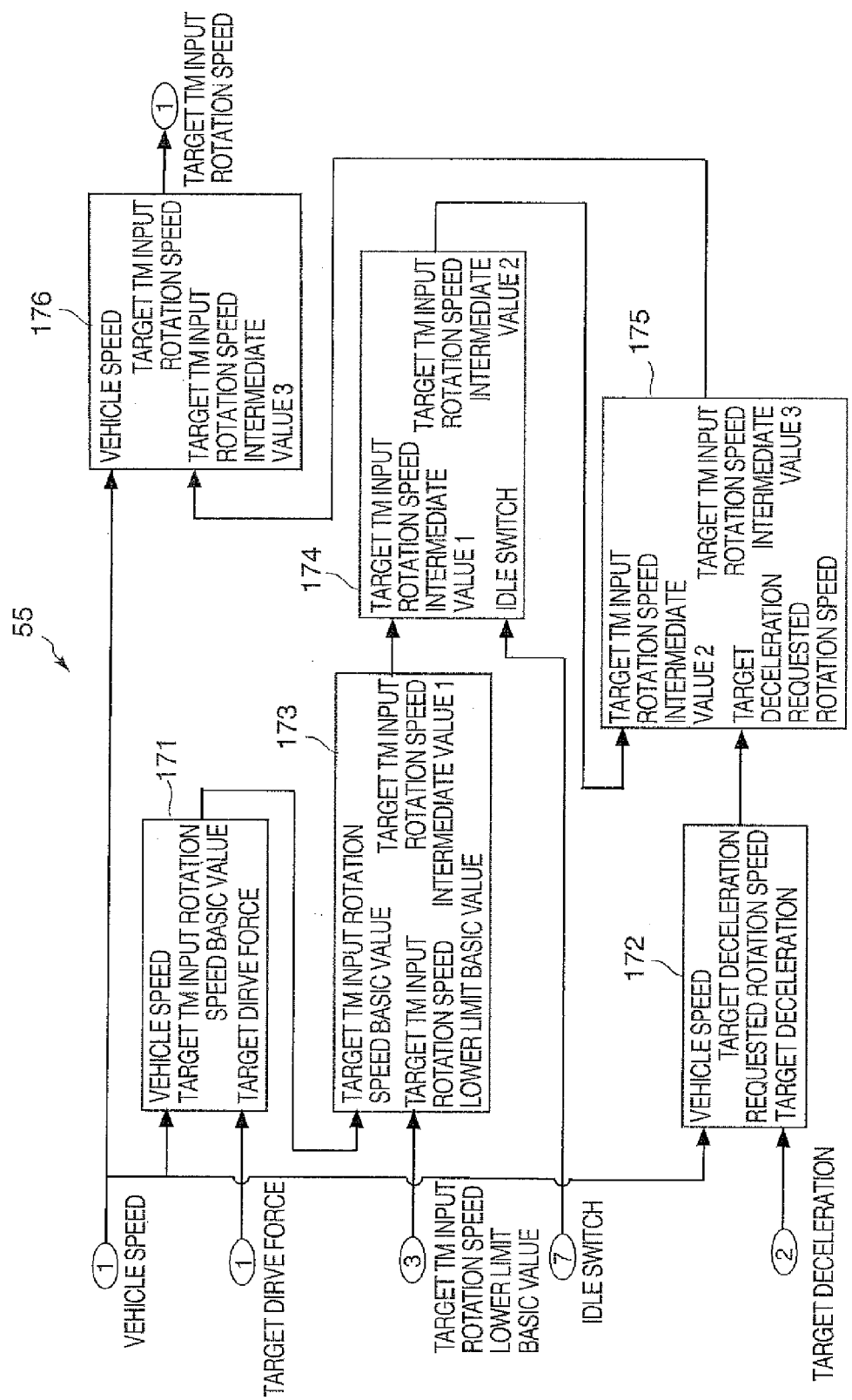
FIG. 16 is a block diagram illustrating a configuration of a target TM input rotation speed computation part provided in the target drive force generation part.

Referring to FIG. 16, the target TM input rotation speed computation part 55 comprises a target TM input rotation speed basic value computation part 171, a target deceleration request corresponding rotation speed computation part 172, a first target TM input rotation speed intermediate value computation part 173, a second target TM input rotation speed intermediate value computation part 174, a third target TM input rotation speed intermediate value computation part 175, and a target TM input rotation speed output part 176.

Figure 17:
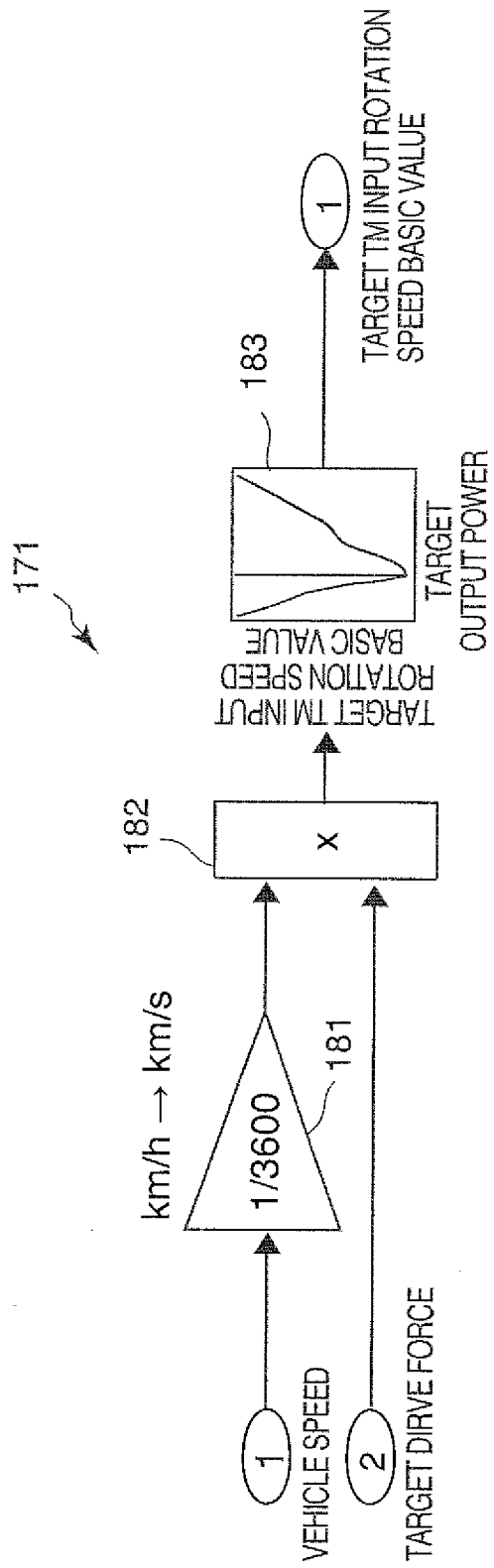
FIG. 17 is a block diagram illustrating a configuration of a target TM input rotation speed basic value computation part provided in the target TM input rotation speed computation part.

Referring to FIG. 17, the target TM input rotation speed basic value computation part 171 comprises a unit converter 181, a multiplier 182, and a target TM input rotation speed basic value output part 183.

The unit converter 181 converts the vehicle speed from speed per hour units to speed per second units. The multiplier 182 calculates a target output force by multiplying the target drive force output by the target drive force computation part 53 shown in FIG. 3 by the vehicle speed converted into a speed per second by the unit converter 181. The target TM input rotation speed basic value output part 183 computes a target TM input rotation speed basic value by referring to a map stored in the ROM of the controller 21 in advance on the basis of the target output force.

Figure 20:
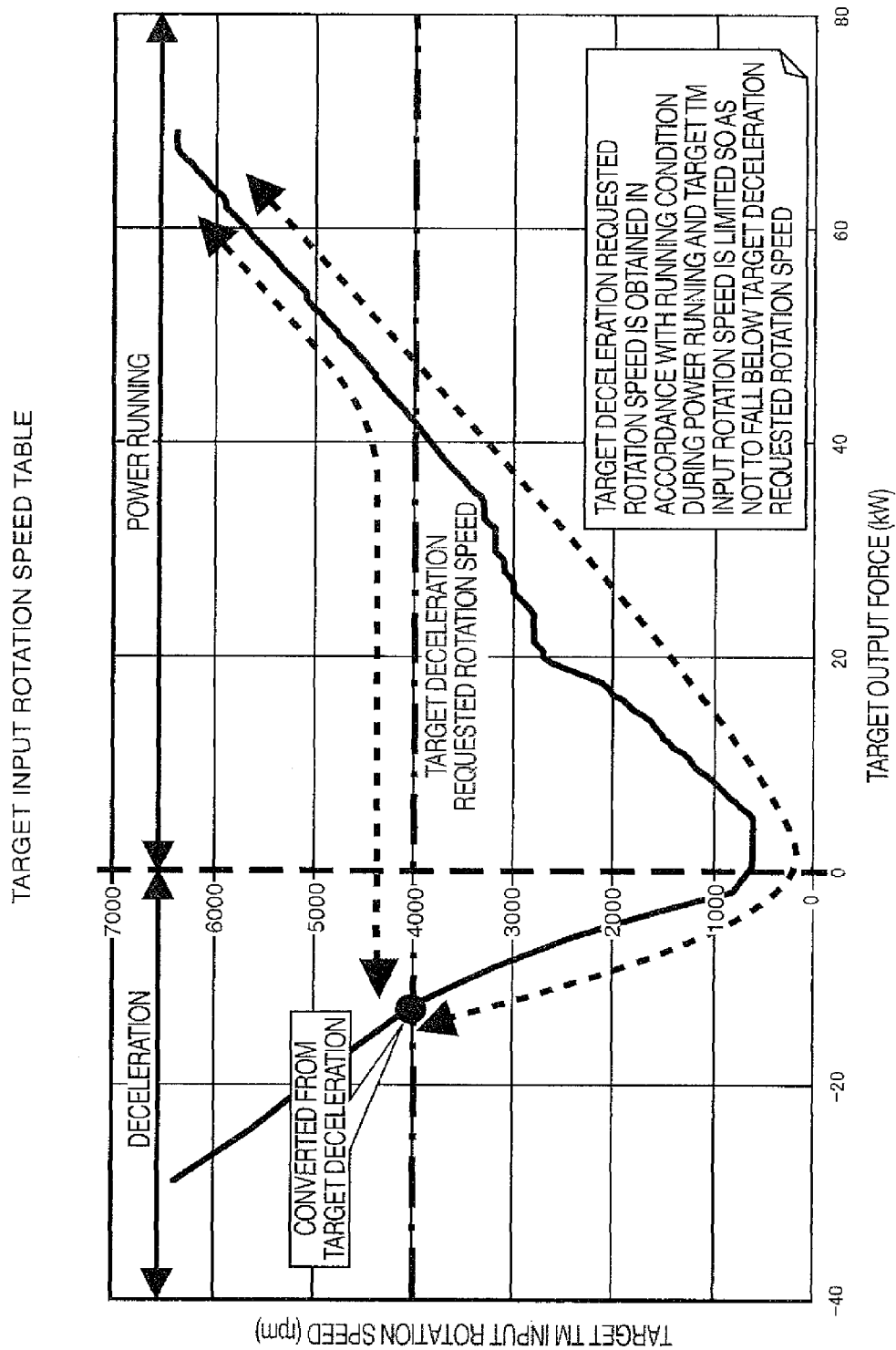
FIG. 20 is a diagram illustrating characteristics of a map of a target TM input rotation speed basic value, which is stored in the target TM input rotation speed basic value computation part.

Referring to FIG. 20, content of the map will be described. The abscissa in the figure shows the target output force, and the ordinate shows the target TM input rotation speed. A subtracter region indicates a condition in which torque is transmitted from the primary pulley 13 to the secondary pulley 14 in the CVT 12, or in other words a condition in which the drive wheel is being driven to rotate by the internal combustion engine 1. A deceleration region indicates a condition in which torque is transmitted from the secondary pulley 14 to the primary pulley 13, or in other words an engine braking condition.

It should be noted that the target TM input rotation speed basic value output part 183 refers to the power-running region part of the map.

As shown by a solid line in the figure, at a target output force zero kw serving as a boundary between the power-running region and the deceleration region, the target TM input rotation speed takes a minimum value.

Figure 18:
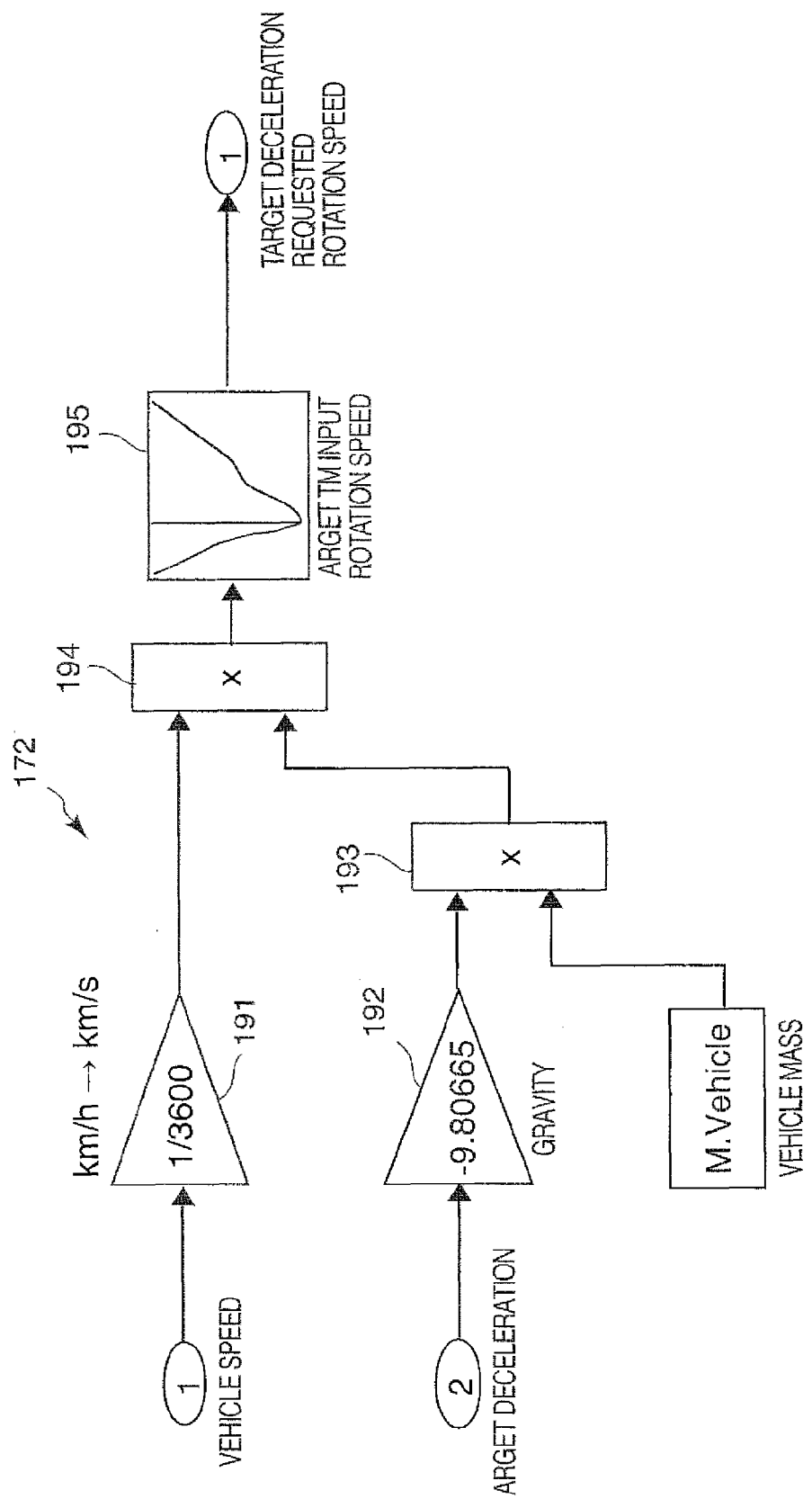
FIG. 18 is a block diagram illustrating a configuration of a target deceleration request corresponding rotation speed computation part provided in the target TM input rotation speed computation part.

Referring to FIG. 18, the target deceleration request corresponding rotation speed computation part 172 comprises unit converters 191 and 192, multipliers 193 and 194, and a target deceleration request corresponding rotation speed output part 195.

The unit converter 191 converts the vehicle speed from speed per hour units into speed per second units. The unit converter 192 multiplies the gravitational acceleration by the target deceleration output by the target deceleration computation part 52. The multiplier 193 calculates a target deceleration drive force by multiplying the vehicle mass by the output of the unit converter 192. The unit of the target deceleration is the gravitational constant (G), and the unit of the target deceleration drive force is newtons (N).

The multiplier 194 calculates the target deceleration by multiplying the vehicle speed in speed per second units, output by the unit converter 191, by the target deceleration drive force. The target deceleration request corresponding rotation speed output part 195 computes a target deceleration request corresponding rotation speed by referring to a map stored in the ROM of the controller 21 in advance on the basis of the target deceleration. This map corresponds to the deceleration region part of the map shown in FIG. 20.

Figure 19:
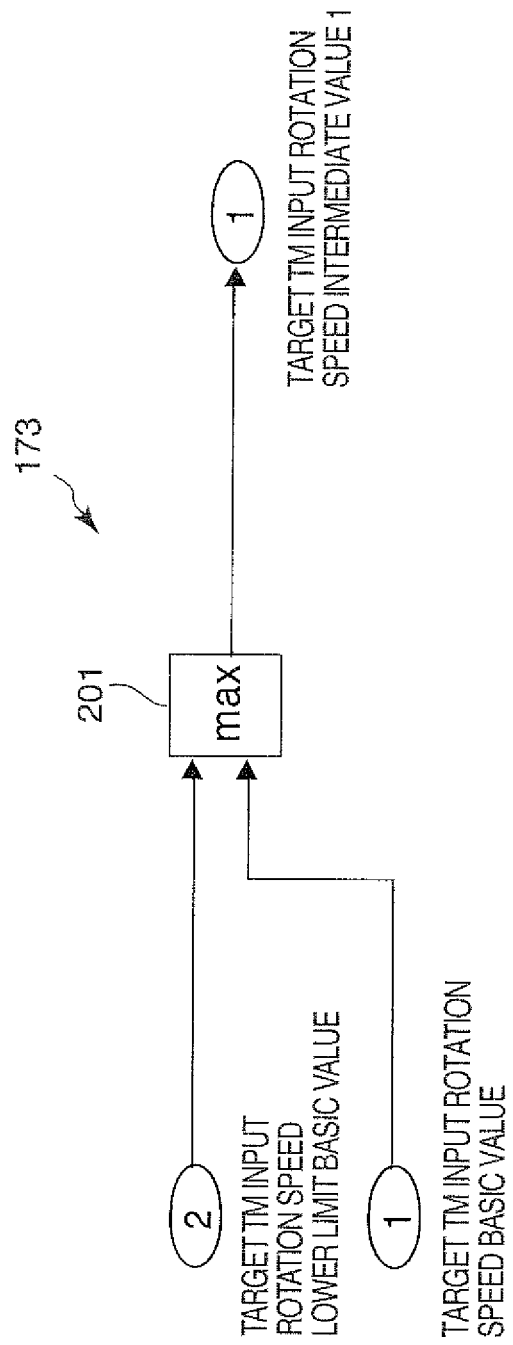
FIG. 19 is a block diagram illustrating a configuration of a first target TM input rotation speed intermediate value computation part provided in the target TM input rotation speed computation part.

Referring to FIG. 19, the first target TM input rotation speed intermediate value computation part 173 comprises a maximum value output circuit 201. The maximum value output circuit 201 outputs the larger of the target TM input rotation speed basic value calculated by the target TM input rotation speed basic value computation part 171 and the target TM input rotation speed lower limit basic value calculated by the target TM input rotation speed lower limit basic value computation part 51 as a target TM input rotation speed intermediate value 1.

Figure 21:
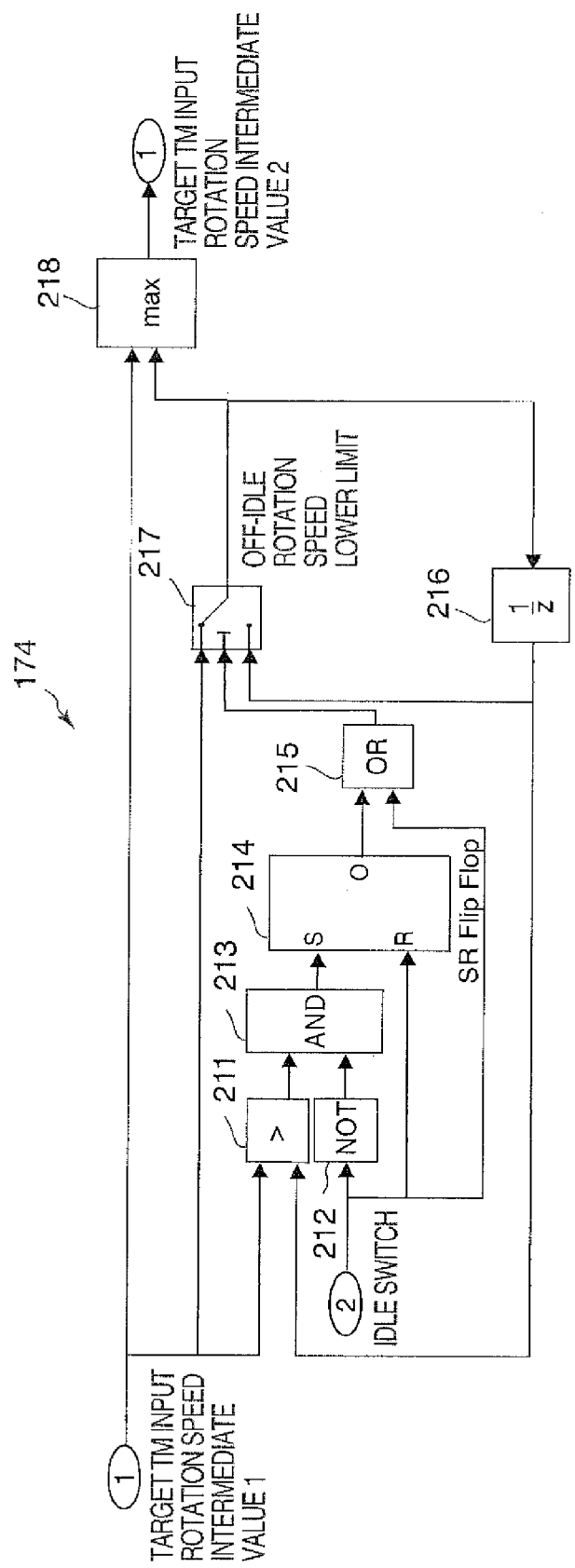
FIG. 21 is a block diagram illustrating a configuration of a second target TM input rotation speed intermediate value computation part provided in the target TM input rotation speed computation part.

Referring to FIG. 21, the second target TM input rotation speed intermediate value computation part 174 comprises a comparator 211, a NOT circuit 212, an AND circuit 213, a flip-flop circuit 214, an OR circuit 215, a delay unit 216, a switch 217, and a maximum value output circuit 218.

The comparator 211 compares the target TM input rotation speed intermediate value 1 calculated by the first target TM input rotation speed intermediate value computation part 173 with an off-idle rotation speed lower limit to be described below, and outputs a Boolean value indicating YES/NO. More specifically, the comparator 211 outputs an ON signal when the former is larger than the latter, and outputs an OFF signal in all other cases. The NOT circuit 212 outputs an ON signal when the idle switch is OFF, and outputs an OFF signal in all other cases. The AND circuit 213 outputs an ON signal when the respective output signals of the comparator 211 and the NOT circuit 212 are both ON or both OFF. The flip-flop circuit 214 outputs an ON signal when the output signal of the AND circuit 213 and the output signal of the idle switch are both ON. The OR circuit 215 outputs an ON signal when the output signal of the flip-flop circuit 214 or the output signal of the idle switch is ON.

The switch 217 is switched in accordance with the output signal of the OR circuit 215 so as to output the target TM input rotation speed intermediate value 1 as the off-idle rotation speed lower limit when the output signal of the OR circuit 215 is ON. When the output signal of the OR circuit 215 is OFF, on the other hand, the switch 217 outputs a previous value of the off-idle rotation speed lower limit, output by the delay unit 216, as the off-idle rotation speed lower limit. The delay unit 216 outputs the off-idle rotation speed lower limit output by the switch 217 to the comparator 211 and the switch 217 as the previous value of the off-idle rotation speed lower limit to be used during subsequent control. The maximum value output circuit 218 outputs the larger of the target TM input rotation speed intermediate value 1 and the off-idle rotation speed lower limit as a target TM input rotation speed intermediate value 2.

Next, referring to FIGS. 25A-25F, functions of the second target TM input rotation speed intermediate value computation part 174 having the above configuration will be described.

A role of the second target TM input rotation speed intermediate value computation part 174 is to prevent a reduction in the rotation speed of the internal combustion engine 1 when the vehicle re-accelerates after a deceleration operation.

While the deceleration operation is underway in the vehicle, the idle switch is ON. Accordingly, the output of the NOT circuit 212 switches ON, and as a result, as shown in FIG. 25F, the switch 217 continues to output the target TM input rotation speed intermediate value 1 as the off-idle rotation speed lower limit.

When the idle switch is OFF, on the other hand, one of the signals input into the OR circuit 215 is an OFF signal. Here, a condition on which the other signal input into the OR circuit 215 switches ON is satisfied when the target TM input rotation speed intermediate value 1 is found by the comparator 211 to exceed the previous value of the off-idle rotation speed lower limit so that the output of the AND circuit 213 switches ON, whereby a set S of the flip-flop circuit 214 switches to 1. At this time, the idle switch is OFF, and therefore a reset R is at 0. Accordingly, the flip-flop circuit 214 outputs the ON signal. The flip-flop circuit 214 continues to output an ON signal as long as this condition remains satisfied. When the idle switch is switched ON, the flip-flop circuit 214 is reset such that thereafter, the flip-flop circuit 214 outputs an OFF signal.

When the target TM input rotation speed lower limit basic value is higher than the target TM input rotation speed basic value while a deceleration operation is underway in the vehicle, the first target TM input rotation speed intermediate value computation part 173 outputs the target TM input rotation speed lower limit basic value as the target TM input rotation speed intermediate value 1. Therefore, as shown in FIG. 25D, the target TM input rotation speed intermediate value 1 exceeds the target TM input rotation speed basic value. As shown in FIG. 25A, when the vehicle shifts to a re-acceleration state in this condition, the engine brake request is switched OFF, as shown in FIG. 25D. As a result, the output signal of the OR circuit 62 shown in FIG. 4 is switched OFF, whereby the switch 63 switches the target TM input rotation speed lower limit basic value to zero. The target TM input rotation speed intermediate value 1 output by the first target TM input rotation speed intermediate value computation part 173 in FIG. 19 is switched from the target TM input rotation speed lower limit basic value applied up to that point to the target TM input rotation speed basic value.

As shown in FIG. 25F, in response to this switch, a dip occurs in the target TM input rotation speed intermediate value 1 immediately after the idle switch switches from ON to OFF. The second target TM input rotation speed intermediate value computation part 174, meanwhile, maintains the off-idle rotation speed lower limit output by the delay unit 216. The maximum value output circuit 218 outputs the larger of the off-idle rotation speed lower limit and the target TM input rotation speed intermediate value 1 as the target TM input rotation speed intermediate value 2. Therefore, even when the target TM input rotation speed intermediate value 1 dips, the target TM input rotation speed intermediate value 2 does not fall below the off-idle rotation speed lower limit.

It should be noted that this condition is cancelled when the idle switch is switched ON. In so doing, reductions in the rotation speed of the internal combustion engine 1 are not restricted needlessly.

Figure 22:
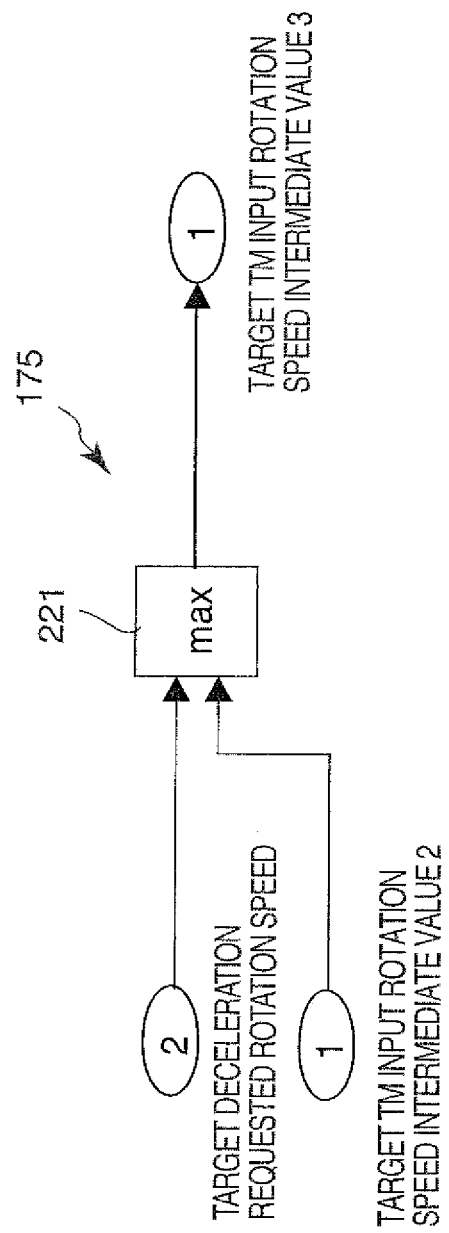
FIG. 22 is a block diagram illustrating a configuration of a third target TM input rotation speed intermediate value computation part provided in the target TM input rotation speed computation part.

Referring to FIG. 22, the third target TM input rotation speed intermediate value computation part 175 is constituted by a maximum value output circuit 221. The maximum value output circuit 221 outputs the larger of the target TM input rotation speed intermediate value 2 calculated by the second target TM input rotation speed intermediate value computation part 174 and a target deceleration request corresponding rotation speed calculated by the target deceleration request corresponding rotation speed computation part 172 as a target TM input rotation speed intermediate value 3.

Next, referring to FIGS. 26A-26F, functions of the third target TM input rotation speed intermediate value computation part 174 having the above configuration will be described.

A role of the third target TM input rotation speed intermediate value computation part 175 is to limit a lower limit of the target TM input rotation speed intermediate value 2, calculated by the second target TM input rotation speed intermediate value computation part 174, on the basis of the target deceleration request corresponding rotation speed.

Figure 26A:
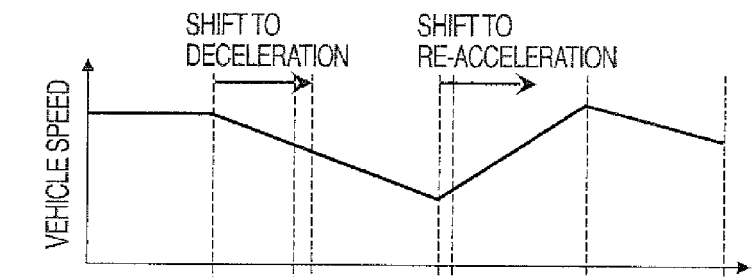
FIGS. 26A-26F are timing charts illustrating functions of the third target TM input rotation speed intermediate value computation part.
Figure 26B:
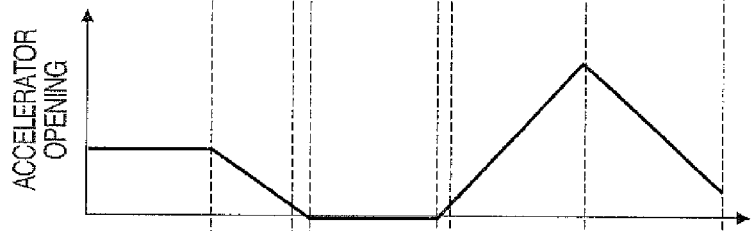
Figure 26C:
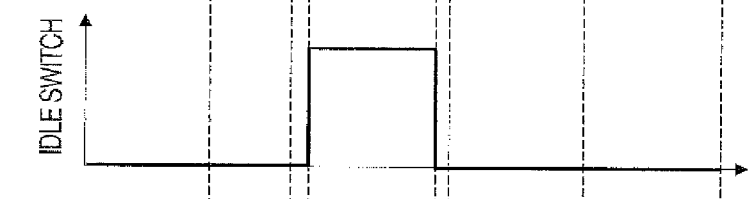
Figure 26D:
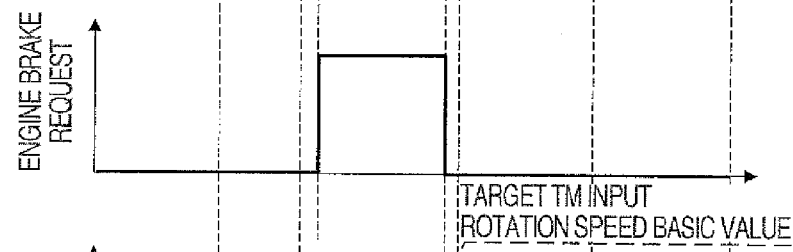
Figure 26E:
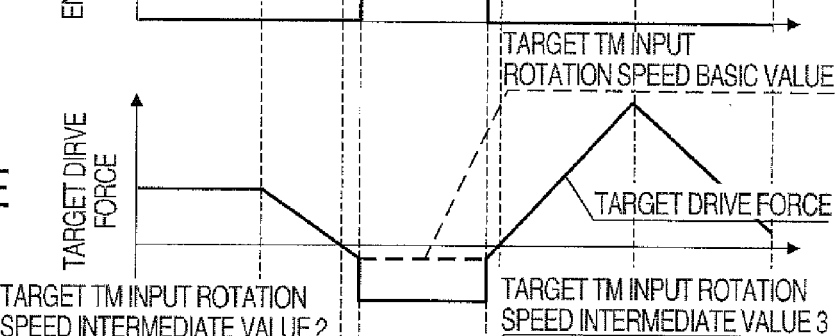
Figure 26F:
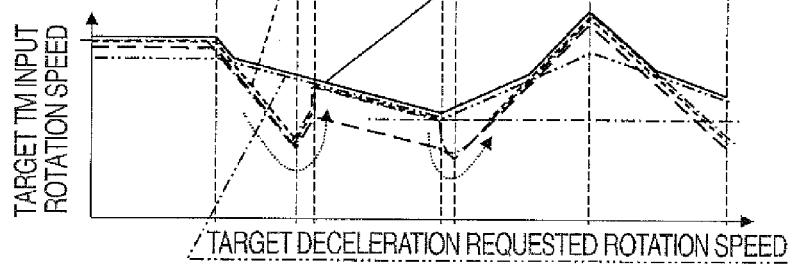

The target deceleration request corresponding rotation speed is calculated constantly, regardless of whether or not the vehicle is decelerating. In so doing, a rotation speed lower limit for a subsequent deceleration operation can be set appropriately in the vehicle non-deceleration state. Here, a dip occurs in the target TM input rotation speed intermediate value 2, as shown in FIG. 26F, immediately before the idle switch switches from OFF to ON, as shown in FIG. 26C. In this case, the third target TM input rotation speed intermediate value computation part 175 outputs the target TM input rotation speed intermediate value 3, which is obtained by limiting the lower limit of the target TM input rotation speed intermediate value 2 by the target deceleration request corresponding rotation speed. As a result, as shown in FIG. 26F, a dip does not occur in the target TM input rotation speed intermediate value 3 even when a dip occurs in the target TM input rotation speed intermediate value 2 immediately before the idle switch switches from OFF to ON.

Figure 23:
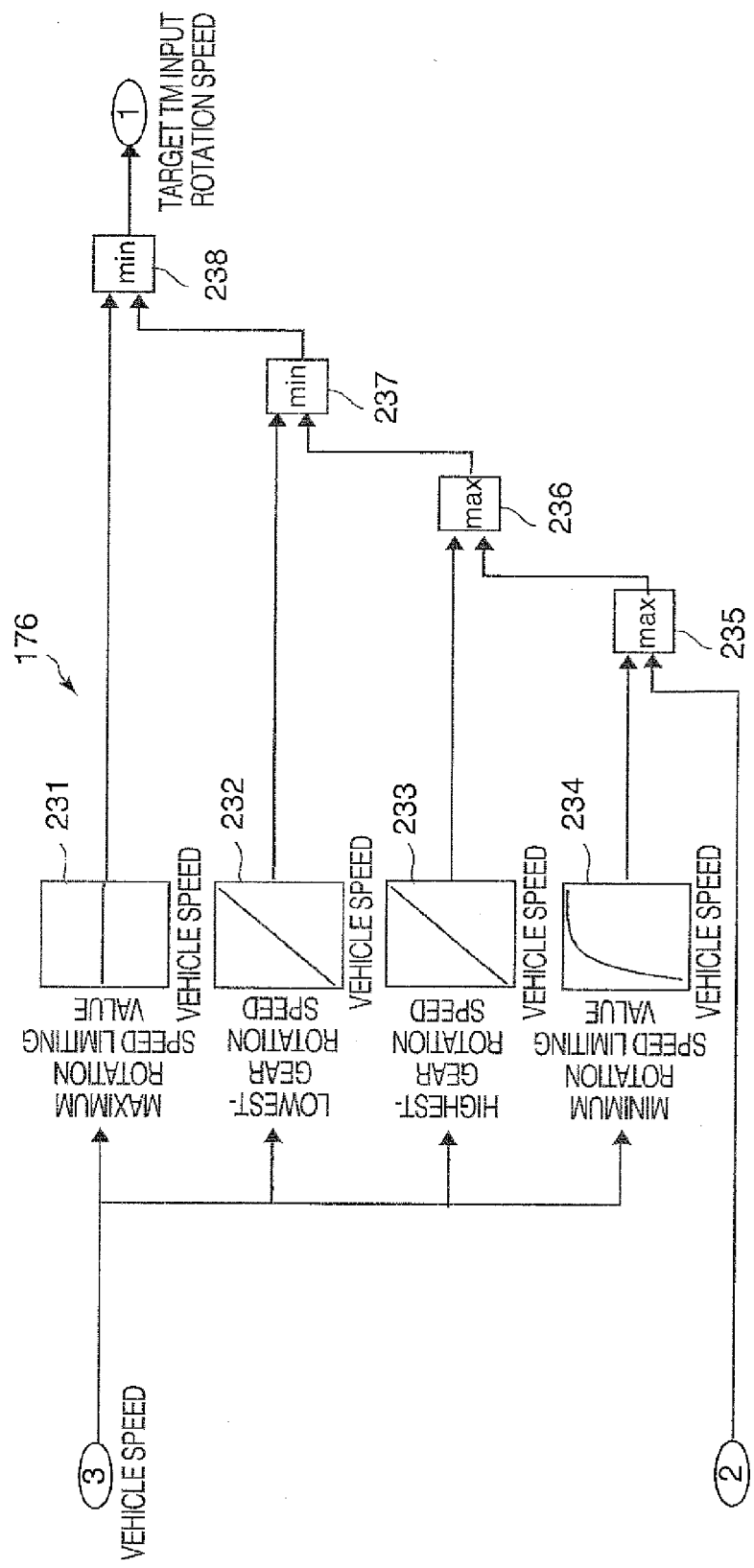
FIG. 23 is a block diagram illustrating a configuration of a target TM input rotation speed output part provided in the target TM input rotation speed computation part.

Referring to FIG. 23, the target TM input rotation speed output part 176 comprises a maximum rotation speed limiting value computation part 231, a lowest-gear rotation speed computation part 232, a highest-gear rotation speed computation part 233, a minimum rotation speed limiting value computation part 234, maximum value output circuits 235 and 236, and minimum value output circuits 238 and 239.

The maximum rotation speed limiting value computation part 231 outputs a maximum rotation speed limiting value, which is a fixed value stored in advance. The lowest-gear rotation speed computation part 232 calculates a lowest-gear rotation speed from the vehicle speed on the basis of the lowest gear ratio of the CVT 12. The highest-gear rotation speed computation part 233 calculates a highest-gear rotation speed from the vehicle speed on the basis of the highest gear ratio of the CVT 12. The minimum rotation speed limiting value computation part 234 calculates a minimum rotation speed limiting value in accordance with the vehicle speed.

The maximum value output circuit 235 outputs the larger of the minimum rotation speed limiting value output by the minimum rotation speed limiting value computation part 234 and the target TM input rotation speed lower limit basic value output by the target TM input rotation speed lower limit basic value computation part 51. The maximum value output circuit 236 outputs the larger of the output of the maximum value output circuit 235 and the highest-gear rotation speed output by the highest-gear rotation speed computation part 233.

The minimum value output circuit 237 outputs the smaller of the output of the maximum value output circuit 236 and the lowest-gear rotation speed output by the lowest gear rotation speed computation part 232. The minimum value output circuit 238 outputs the smaller of the output of the minimum value output circuit 237 and the maximum rotation speed limiting value output by the maximum rotation speed limiting value computation part 231 as the target TM input rotation speed.

Figure 24:
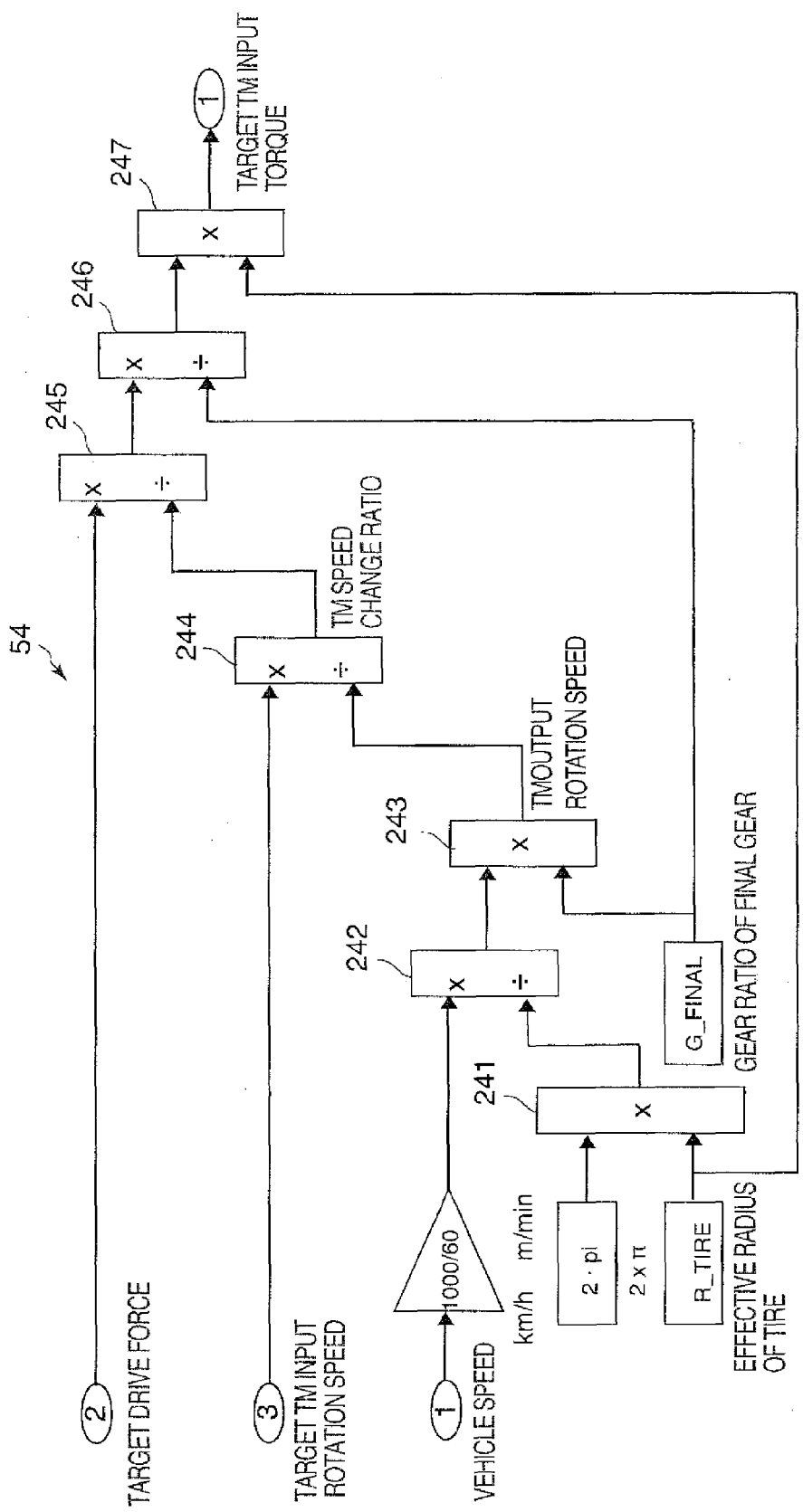
FIG. 24 is a block diagram illustrating a configuration of a target TM input torque computation part provided in the distribution computation part.

Referring to FIG. 24, the target TM input torque computation part 54 shown in FIG. 3 comprises dividers 242 and 244 to 246, and multipliers 241, 243, and 247. The multiplier 241 determines a circumferential length of the tire of the vehicle from an effective radius of the tire. The divider 242 computes the rotation speed of the tire by dividing the vehicle speed (m/min) by the circumferential length of the tire. The multiplier 243 computes a TM output rotation speed of the CVT 12 by multiplying the final gear ratio by the rotation speed of the tire. The divider the 244 computes a TM gear ratio of the CVT 12 from a ratio between the TM output rotation speed and the target TM input rotation speed computed by the target TM input rotation speed computation part 55. The dividers 245 and 246 compute a TM target input drive force by dividing the target drive force computed by the target drive force computation part 52 by the TM gear ratio and the final gear ratio. The multiplier 247 computes a target TM input torque by multiplying the circumferential length of the tire by the TM target input drive force.

When the target TM input rotation speed is corrected alone without varying the target drive force, the target TM input torque calculated by the target TM input torque computation part 54 varies, but the resulting drive force of the vehicle does not vary. In this case, an excess torque of the internal combustion engine 1 varies while the drive force remains constant.

It should be noted that a detection value of the actual TM input rotation speed may be used as the value input into the divider 244 instead of the target TM input rotation speed. When a response delay occurs during a speed change in the CVT 12 in a case where a detection value is used, the target TM input torque for realizing the target drive force is calculated in order to compensate for the response delay.

The controller 21 computes the target TM input torque and the target TM input rotation speed through the processes described above. Using a conventional method, the controller 21 controls the throttle opening by operating the electric motor 5 of the intake throttle device 3 so as to obtain the target TM input torque. Further, the controller 21 controls the gear ratio the CVT 12 so as to obtain the target TM input rotation speed.

As described above, in the drive force control device for a vehicle according to one or more embodiments of the present invention, the controller 21 calculates the target drive force of the vehicle in the vehicle deceleration state on the basis of the vehicle running condition, calculates the target transmission input rotation speed in the vehicle deceleration state on the basis of the target drive force in the vehicle deceleration state, and corrects the target transmission input rotation speed in the vehicle non-deceleration state on the basis of the target transmission input rotation speed in the vehicle deceleration state.

Hence, a relationship between the accelerator opening and the drive force of the vehicle can be corrected as desired even during PTD control. The target TM input rotation speed in the vehicle deceleration state is calculated on the basis of the target drive force in the vehicle deceleration state, and the target TM input rotation speed in the vehicle non-deceleration state is corrected on the basis of the target TM input rotation speed in the vehicle deceleration state, and therefore a dip in the target TM input rotation speed in the vicinity of the boundary between the vehicle deceleration state and the vehicle non-deceleration state can be prevented. As a result, deterioration of an operating characteristic of the vehicle due to a dip in the rotation speed input into the CVT 12 in the vicinity of the boundary between the vehicle deceleration state and the vehicle non-deceleration state can be avoided.

The controller 31 also performs a correction on the basis of the target transmission input rotation speed during a deceleration operation immediately before the vehicle shifts to a non-deceleration operation. As a result, the target transmission input rotation speed in the vehicle non-deceleration state can be corrected appropriately on the basis of an immediately preceding deceleration operation state even when the vehicle does not comprise special running environment detecting means such as a navigation system.

Furthermore, the controller 31 calculates the off-idle rotation speed lower limit on the basis of the target transmission input rotation speed immediately before the vehicle shifts from the vehicle deceleration state to the vehicle non-deceleration state, and corrects the target transmission input rotation speed on the basis of the off-idle rotation speed lower limit. As a result, needless reductions and variation in the rotation speed during a shift to the vehicle re-acceleration state can be prevented.

Moreover, the controller 31 calculates the target drive force for the next deceleration operation in the vehicle non-deceleration state in advance on the basis of the vehicle running condition, and corrects the target transmission input rotation speed on the basis of the target drive force for the next deceleration operation. As a result, needless reductions and variation in the rotation speed can be prevented likewise when the vehicle shifts to a deceleration operation.

Although the invention has been described above with reference to certain embodiments, the invention is not limited to the embodiments described above. Modifications and variations of the embodiments described above will occur to those skilled in the art, within the scope of the claims.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A drive force control device for a vehicle, the vehicle comprising an accelerator pedal, a motive force source that outputs a driving force in the form of a rotation according to an accelerator opening of the accelerator pedal, a drive wheel, and a transmission that transmits the rotation output from the motive force source to the drive wheel after changing a rotation speed thereof, the device comprising:
    an accelerator pedal opening sensor that detects the accelerator opening;
    a vehicle running condition sensor that detects a vehicle running condition; and
    a programmable controller programmed to:
        calculate a target vehicle drive force based on the accelerator opening;
        calculate a target input rotation speed of the transmission based on the target vehicle drive force;
        calculate a target input torque of the transmission based on the target vehicle drive force;
        calculate a target vehicle drive force in a vehicle deceleration state that is a variable value depending on the vehicle running condition;
        calculate a target input rotation speed of the transmission in the vehicle deceleration state based on the target vehicle drive force in the vehicle deceleration state; and
        correct the target input rotation speed of the transmission in a vehicle non-deceleration state based on the target input rotation speed of the transmission in the vehicle deceleration state immediately before the vehicle shifts to the vehicle non-deceleration state.

2. The drive force control device for a vehicle according to claim 1, wherein the controller is further programmed to:
    calculate an off-idle rotation speed lower limit based on the target input rotation speed of the transmission in the vehicle deceleration state immediately before the vehicle shifts from the vehicle deceleration state to the vehicle non-deceleration state; and
    correct the target input rotation speed of the transmission in the vehicle non-deceleration state based on the off-idle rotation speed lower limit.

3. The drive force control device for a vehicle according to claim 1, wherein the controller is further programmed to:
    calculate, in the vehicle non-deceleration state, a target vehicle drive force for a next vehicle deceleration state based on the vehicle running condition; and
    correct the target input rotation speed of the transmission in the vehicle non-deceleration state based on the target vehicle drive force for a next vehicle deceleration state.

4. A drive force control method for a vehicle, the vehicle comprising an accelerator pedal, a motive force source that outputs a driving force in the form of a rotation according to an accelerator opening of the accelerator pedal, a drive wheel, and a transmission that transmits the rotation output from the motive force source to the drive wheel after changing a rotation speed thereof, the method comprising:
- detecting the accelerator opening;
- detecting a vehicle running condition;
- calculating a target vehicle drive force based on the accelerator opening;
- calculating a target input rotation speed of the transmission based on the target vehicle drive force;
- calculating a target input torque of the transmission based on the target vehicle drive force;
- calculating a target vehicle drive force in a vehicle deceleration state that is a variable value depending on the vehicle running condition;
- calculating a target input rotation speed of the transmission in the vehicle deceleration state based on the target vehicle drive force in the vehicle deceleration state; and
- correcting the target input rotation speed of the transmission in a vehicle non-deceleration state based on the target input rotation speed of the transmission in the vehicle deceleration state immediately before the vehicle shifts to the vehicle non-deceleration state.

* * * * *